US007551337B2

(12) United States Patent
Hirakawa et al.

(10) Patent No.: US 7,551,337 B2
(45) Date of Patent: Jun. 23, 2009

(54) OPTICAL SCANNING APPARATUS AND IMAGE FORMING APPARATUS

(75) Inventors: Makoto Hirakawa, Kanagawa (JP); Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 11/496,514

(22) Filed: Aug. 1, 2006

(65) Prior Publication Data

US 2007/0030538 A1 Feb. 8, 2007

(30) Foreign Application Priority Data

Aug. 4, 2005 (JP) ............................ 2005-227276

(51) Int. Cl.
*G02B 26/08* (2006.01)

(52) U.S. Cl. ...................................... 359/204; 347/243

(58) Field of Classification Search .................. 359/204
See application file for complete search history.

(56) References Cited

U.S. PATENT DOCUMENTS

| | | | | |
|---|---|---|---|---|
| 5,999,345 | A * | 12/1999 | Nakajima et al. | 359/821 |
| 6,621,512 | B2 | 9/2003 | Nakajima et al. | |
| 6,771,300 | B2 | 8/2004 | Amada et al. | |
| 6,813,051 | B2 | 11/2004 | Suzuki et al. | |
| 6,987,593 | B2 | 1/2006 | Hayashi et al. | |
| 7,050,082 | B2 | 5/2006 | Suzuki et al. | |
| 7,050,210 | B2 | 5/2006 | Atsuumi et al. | |
| 2004/0001241 | A1 | 1/2004 | Hayashi et al. | |
| 2004/0174427 | A1 | 9/2004 | Iwamoto | |
| 2004/0184127 | A1 | 9/2004 | Nakajima et al. | |
| 2004/0240000 | A1 | 12/2004 | Miyatake et al. | |
| 2005/0093962 | A1 | 5/2005 | Miyatake et al. | |
| 2005/0094234 | A1 * | 5/2005 | Miyatake et al. | 359/205 |
| 2005/0225819 | A1 | 10/2005 | Atsuumi et al. | |
| 2006/0000990 | A1 | 1/2006 | Hayashi et al. | |

FOREIGN PATENT DOCUMENTS

| | | |
|---|---|---|
| JP | 2000-347116 | 12/2000 |

(Continued)

OTHER PUBLICATIONS

U.S. Appl. No. 12/020,292, filed Jan. 25, 2008, Miyatake, et al.

(Continued)

*Primary Examiner*—James Phan
(74) *Attorney, Agent, or Firm*—Oblon, Spivak, McClelland, Maier & Neustadt, P.C.

(57) ABSTRACT

A light source part has a light source unit in which the plurality of light sources respectively emitting the light beams at angles different in a sub-scanning direction with respect to an optical standard plane, parallel to a main scanning direction and passing through a standard axis of a surface shape of a lens of the imaging part, which lens is closest to the deflecting part, and applied to the deflecting part at angles different in the sub-scanning direction, are integrally provided; and the plurality of light sources thus respectively emit the light beams at the angles different in the sub-scanning direction with respect to the optical standard plane.

15 Claims, 19 Drawing Sheets

FOREIGN PATENT DOCUMENTS

| | | |
|---|---|---|
| JP | 2001-13432 | 1/2001 |
| JP | 2002-90672 | 3/2002 |
| JP | 2003-149573 | 5/2003 |
| JP | 2003-215486 | 7/2003 |
| JP | 2004-241906 | 9/2004 |

OTHER PUBLICATIONS

U.S. Appl. No. 11/358,554, filed Feb. 22, 2006.
U.S. Appl. No. 11/857,069, filed Sep. 18, 2007, Hirakawa.
U.S. Appl. No. 12/190,182, filed Aug. 12, 2008, Ichii et al.
U.S. Appl. No. 12/193,902, filed Aug. 19, 2008, Miyatake.

* cited by examiner

OPTICAL SCANNING APPARATUS AND IMAGE FORMING APPARATUS

BACKGROUND OF THE INVENTION

1. Field of the Invention

The present invention relates to an image forming apparatus such as a laser beam printer, a digital copier or such, and in particular, to an optical scanning apparatus for carrying out optical writing and scanning of a photosensitive body or such, and an image forming apparatus employing it.

2. Description of the Related Art

Recently, a color laser printer, a color copier and so forth have been rapidly put into practical use. For this purpose, a configuration by which a plurality of scan lines can be produced on a plurality of photosensitive bodies is demanded in an optical scanning apparatus used there. As a system of meeting the demand, various manners can be considered. For example, a tandem type can be applied in which four photosensitive bodies corresponding to respective color components, i.e., C, M, Y and K (i.e., cyan, magenta, yellow and black, respectively) are provided, for example.

In an optical scanning apparatus in the tandem type as shown in FIG. 11 and FIG. 12 (*a*), in order to obtain a necessary spacing Z to separate light beams for the respective photosensitive bodies, a polygon mirror of two stages is applied. In this case, if a polygon mirror of a single stage is applied instead, the polygon mirror should have a large thickness in a sub-scanning direction accordingly, which may result in difficulty in an increase in a processing speed or a cost reduction. Patent Document 1 discloses an optical scanning apparatus employing a light source unit suitable for such a tandem opposed scanning type. In this optical scanning apparatus, a plurality of light emitting devices and so forth are provided in a plurality of stages in a sub-scanning direction on a plane opposite to an optical deflector.

Further, a so-called oblique entrance optical system is known as a scanning optical system for a reduced cost suitable to the tandem type configuration in which light beams are applied to a deflection reflective surface of an optical deflector at angles different in a sub-scanning direction with respect to a normal of the deflection reflective surface. As can be seen from FIG. 12 (*b*), in this system, a thickness of the polygon mirror should not necessarily be increased for the purpose of ensuring the necessary spacing Z for separating the light beams for the respective to-be-scanned surfaces. Thereby, the oblique entrance optical system may be reduced in the cost.

However, the oblique entrance optical system may involve a problem of scan line bending. An actual amount of the scan line bending depends on an oblique entrance angle in a sub-scanning direction of each light beam, and color drift may occur when latent images drawn with these light beams are visualized by toners of respective colors and are superposed together. Further, as a result of the oblique entrance, the light beam may be applied to the scanning lens in a twisted manner, wavefront aberration may increase, especially optical performance may remarkably degrade at a peripheral image height, and a beam spot diameter may increase. As a result, high quality image formation may become difficult. In order to solve the problem, the oblique entrance angle should preferably be reduced in the optical system.

In the oblique entrance optical system, light beam entrance is made from the light source for a rotational axis of the polygon mirror. Accordingly, the oblique entrance angle increases in order to avoid interference with the scanning lens when the light source is disposed at a position just corresponding to the scanning lens in the main scanning direction. In order to reduce the oblique entrance angle, various methods may be applied. However, an increase in the light path length of the front side optical system for this purpose may result in an increase in the apparatus size, which may result in difficulty in meeting the needs of the market.

When the above-mentioned oblique entrance optical system is applied to the tandem type configuration, an opposed type scanning oblique entrance optical system or a single side scanning oblique entrance optical system may be applied. The first one is such that, as shown in FIG. 13 (*a*), two light beams are deflected by each of opposite surfaces of the polygon mirror. As shown, since only two light beams can be applied to each side, light beam entrance is made symmetrically with respect to an optical standard plane at the same oblique entrance angle. In contrast thereto, the second one is such that, as shown in FIG. 13 (*b*), all the light beams are applied to the same surface of the polygon mirror. In this case, as shown, the light source part can be provided concentrically only on the single side, and also, the lens closest to the polygon mirror (optical deflector) can be shared for all the four light beams. Thus, the number of required components can be reduced in the single side scanning oblique entrance optical system. Patent Document 2 discloses an optical scanning apparatus employing a light source unit suitable to the opposed type scanning oblique entrance optical system. In this optical scanning apparatus, light beams emitted are inclined in their optical axes in such a manner that these light beams intersect each other at a predetermined angle θ, and required light sources are integrated into a single unit.

It is noted that Patent Document 1 denotes Japanese Laid-open Patent Application No. 2002-90672; and Patent Document 2 denotes Japanese Laid-open Patent Application No. 2004-271906.

The configuration of Patent Document 1 may not be advantageous in that the polygon mirror in the two stages may obstruct an increase in the processing speed or the cost reduction. Also, the required number of components may increase since the light source parts and imaging optical systems should be provided on both sides of the polygon mirror, which may obstruct the cost reduction.

The configuration of the Patent Document 2 also may have a problem the same as that of Patent Document 1 that the light source parts and imaging optical systems provided on both sides of the polygon mirror may obstruct the cost reduction. Further, when this configuration is applied to the single side scanning oblique entrance optical system, a plurality of the oblique entrance angles with respect to the optical standard plane are required, and thus, the required number of optical units may increase. This is because light beams from a plurality of light sources included in a single light source unit are applied to the polygon mirror at the equal oblique entrance angles with respect to the optical standard plane, respectively. Therefore, when the configuration is applied to the single side scanning oblique entrance optical system in which four light beams should be applied from one side, a plurality of oblique entrance angles are required even when the optically plane symmetrical configuration is applied.

As a result, the required number of the different light source units each having 'the oblique entrance angle symmetrical with respect to the optical standard plane' should be equal to the number of the required oblique entrance angles. Thus, the required number of units increases, and thus, the cost reduction of the optical system may not be achieved.

The above-mentioned two configurations of Patent Documents 1 and 2 assume the opposed type scanning oblique entrance optical system, and thus, may involve the problem of the increase in the required number of components. In contrast thereto, the single side scanning oblique entrance optical system may be advantageous in terms of reduction in the required number of components. However, in the single side scanning oblique entrance optical system (see FIG. 13 (*b*)), the four light beams should be applied to the common surface of the polygon mirror. In other words, although these four beams may be applied at respective angles having no relationship thereamong, it is necessary that two sets of light beams, each set including two light beams which form a pair with respect to the optical standard plane, are provided, and these sets of light beams are applied at oblique entrance angles different from each other.

SUMMARY OF THE INVENTION

The present invention has been devised in consideration of the above-mentioned problem, and an object of the present invention is to provide an optical scanning apparatus, at low cost, which is compact, merely requires the reduced number of components, and can provide high image quality.

In order to achieve the object, the present invention includes a light source part including a plurality of light sources for scanning respective different targets and coupling lenses corresponding thereto respectively; a deflecting part deflecting light beams from the plurality of light sources; and an imaging part forming images on the respective targets with the light beams, wherein the light source part includes a light source unit in which the plurality of light sources respectively emitting the light beams at angles different in a sub-scanning direction with respect to an optical standard plane, parallel to a main scanning direction and passing through a standard axis of a surface shape of a lens of the imaging part, which lens is closest to the deflecting part, the light beams being applied to the deflecting part at angles different in the sub-scanning direction, are integrally provided; and the plurality of light sources are inclined so that the plurality of light sources thus respectively emit the light beams at the angles different in the sub-scanning direction with respect to the optical standard plane.

In this configuration according to the present invention, the plurality of light beams from the light source unit part of the light source are applied to the deflection surface of the optical deflector at the angles different from each other in the sub-scanning direction with respect to the optical standard plane, the light beams are then deflected thereby, and then, the light beams are applied to the imaging optical system. Thus, the four light beams can be applied to the common surface of the polygon mirror. Further, two sets of light beams each set having a pair of light beams which are applied at the different angles can be provided. Thereby, the oblique entrance angles can have a predetermined relationship. Further, in one example, the configuration of the present invention may be applied to the single side scanning oblique entrance optical system. Thereby, the entirety of the apparatus can be miniaturized, and the required number of components can be reduced.

Thus, according to the present invention, it is possible to miniaturize the optical scanning apparatus, and also, the required number of components in the apparatus can be reduced. As a result, the cost of the apparatus can be reduced, and also, optical scanning apparatus providing high image quality can be achieved.

Other objects and further features of the present invention will become more apparent from the following detailed description when read in conjunction with the accompanying drawings:

DETAILED DESCRIPTION OF THE PREFERRED EMBODIMENTS

An optical scanning apparatus according to one embodiment of the present invention will now be described.

Figure 1:
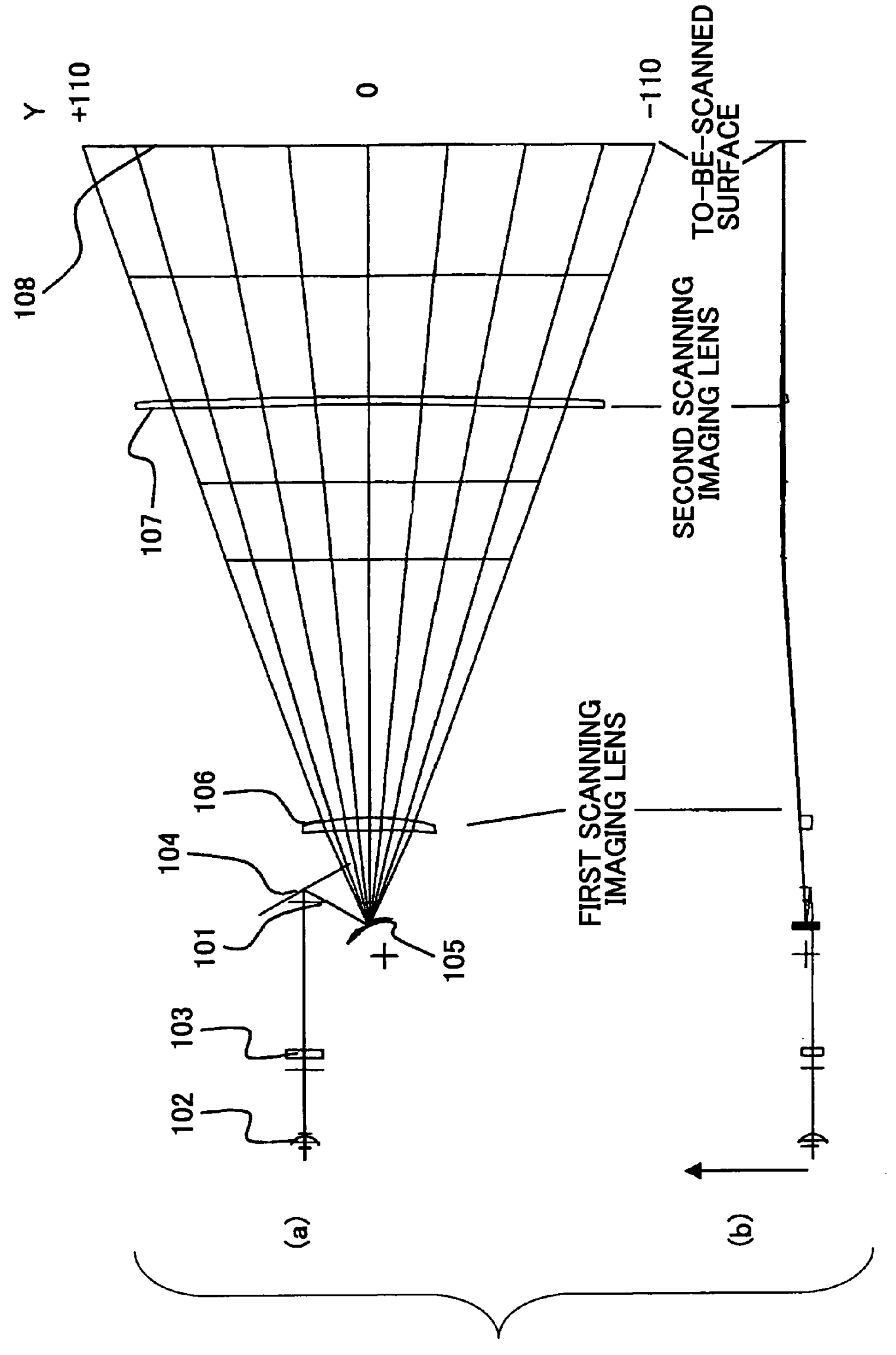
FIG. 1 shows sectional views of a configuration of an optical scanning apparatus according to one embodiment of the present invention.

FIG. 1 shows a sectional view of the optical scanning apparatus in the embodiment of the present invention. FIG. 1 (*a*) shows a sectional view of a main scanning direction and FIG. 1 (*b*) shows a sectional view of a sub-scanning direction. As shown in FIG. 1 (*a*), a diverging light beam 101 emitted by a semiconductor laser (light source) is transformed into a beam in a form suitable to a subsequent optical system by means of a coupling lens 102. The light beam in the form thus transformed may be a parallel light beam, a weak diverging light beam or a weak converging light beam. The light beam from the coupling lens 102 is condensed in the sub-scanning direction by means of a cylindrical lens 103, and is applied to a deflection reflective surface of an optical deflector 105 after being reflected by a reflective mirror 104. Then, passing through a first scanning imaging lens 106 and a second scanning imaging lens 107, the light beam scans a to-be-scanned surface 108. As shown in FIG. 1 (*b*), the light beam from the light source side is applied to the deflection reflective surface of the optical deflector 105 in such a manner that it is inclined with respect to a plane which perpendicularly intersects a rotation axis of the optical deflector 105. Accordingly, the light beam reflected by the deflection reflective surface of the optical deflector is also inclined with respect to the above-mentioned plane. The light beam is thus made inclined with respect to the plane perpendicular to the rotation axis of the optical deflector 105, by means of a function of a light source unit according to an embodiment of the present invention.

Figure 2:
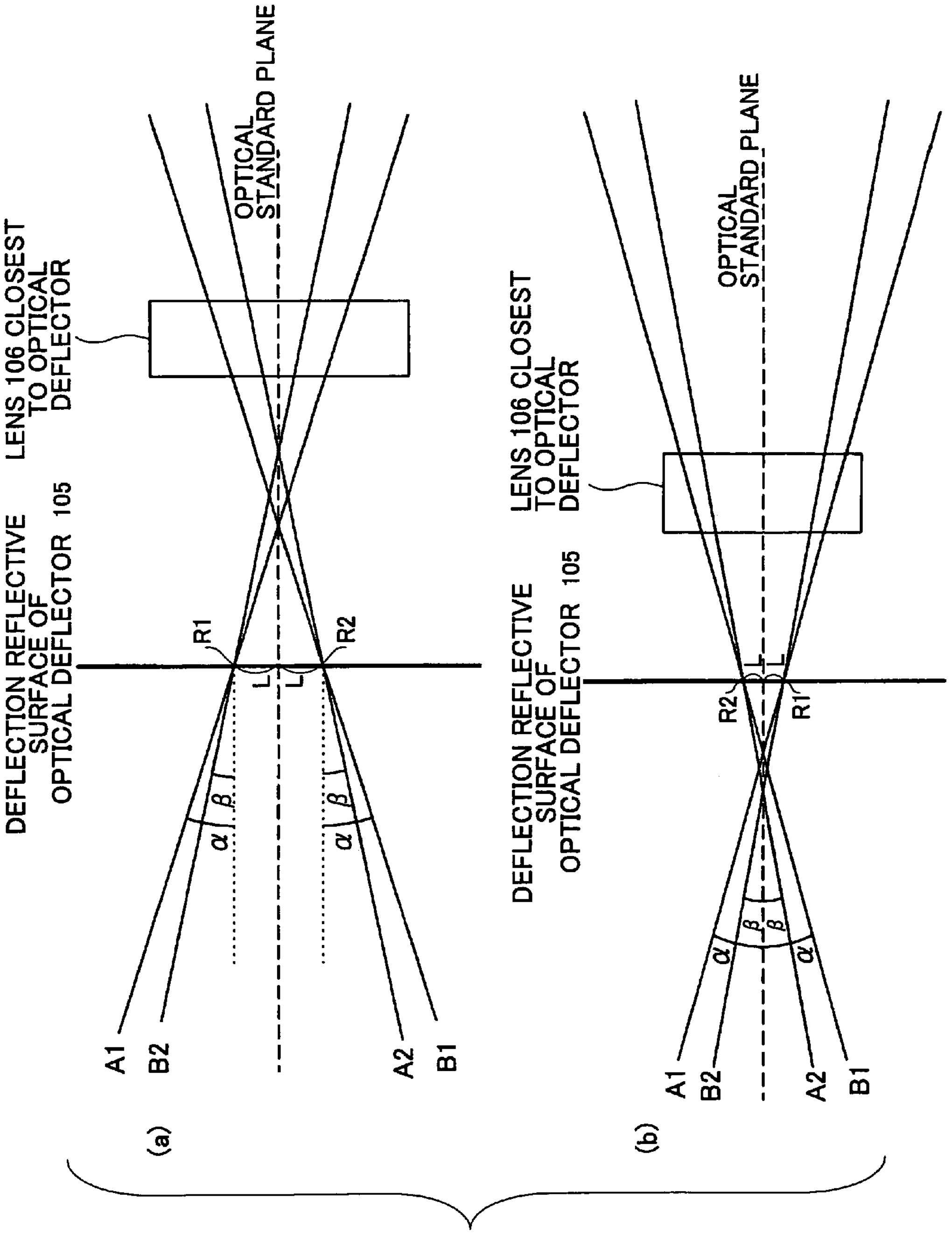
FIGS. 2 and 3 show conceptual diagrams of light beams from light source units in embodiments of the present invention.
Figure 16:
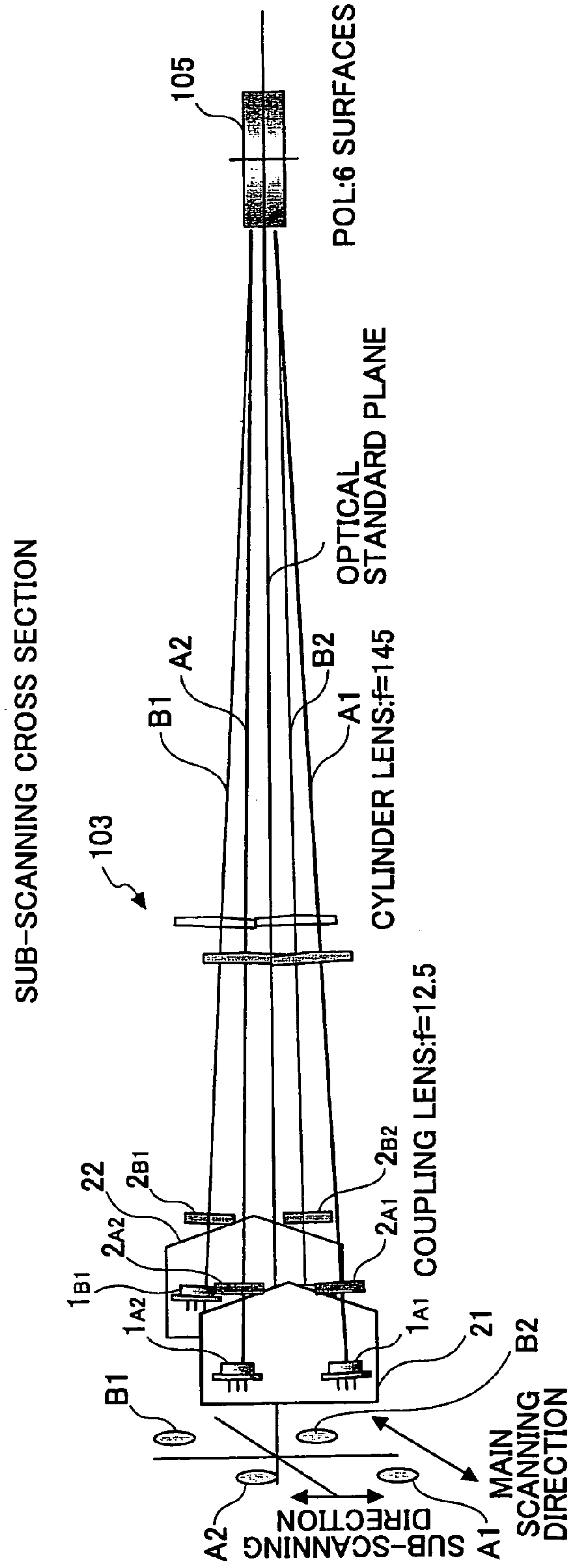
FIGS. 16 and 17 show inclination of light sources in light source units according to embodiments of the present invention.
Figure 17:
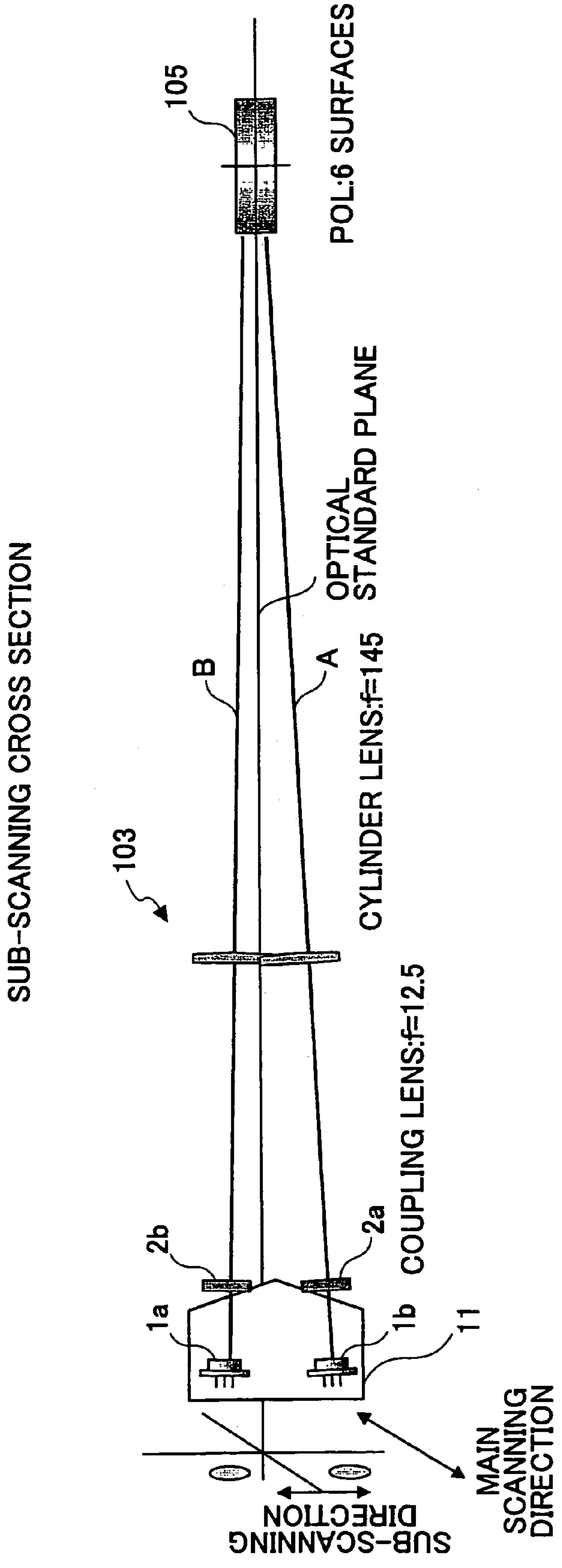

FIG. 2 shows conceptual diagrams of light beams when the light source unit according to the embodiment of the present invention is applied in a single side scanning type tandem optical system. Light beams A1, A2, B1 and B2 shown are those emitted from light sources provided in respective common light source units (A1 and A1 are emitted from one light source unit and B1 and B2 are from the other). A setting is made such that these light beams are applied to the deflection reflective surface of the optical deflector 105 obliquely at oblique entrance angles different in the sub-scanning direction with respect to the optical standard plane. In FIG. 2, the oblique entrance angles are a for the light beams A1 and B1 while the same are for the light beams A2 and B2, as shown. For this purpose, the respective light sources $\mathbf{1}_{A1}$, $\mathbf{1}_{A2}$, $\mathbf{1}_{B1}$ and $\mathbf{1}_{B2}$, are mounted in an inclined manner, as shown in FIGS. 16 and 17. Further, in the embodiment of the present invention, the four light beams required for a full color tandem optical system (see FIG. 13 (*b*)) are emitted for the optical deflector 105 as a result of two light source units 21 and 22 each having the two light sources $\mathbf{1}_{A1}$ and $\mathbf{1}_{A2}$ or $\mathbf{1}_{B1}$ and $\mathbf{1}_{B2}$ are integrally combined (see FIGS. 6, 16 and 18).

Figure 3:
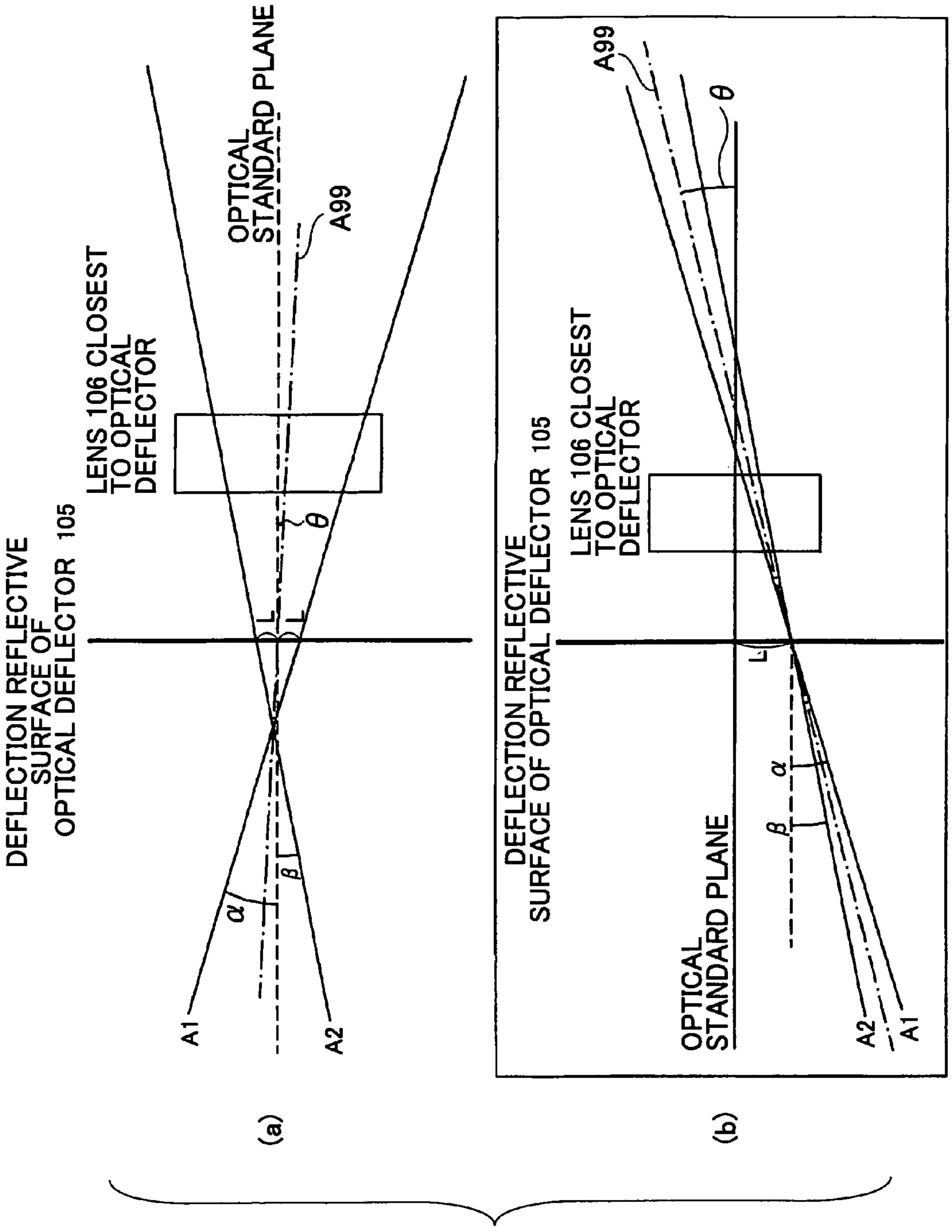

FIG. 3 shows a conceptual diagram of light beams when the light beams are applied from the light source unit of one side in the configuration of FIG. 2 (*a*) or 2 (*b*). There, the two beams from the common light source unit is applied to the deflection reflective surface of the optical deflector 105 in a state in which a center line of the two light beams from the common light source unit has an angle θ on the sub-scanning section with respect to the optical standard plane. That is, the center line A99 of the two light beams A1 and A2 intersects with the optical standard plane at the angle θ.

Figure 19:
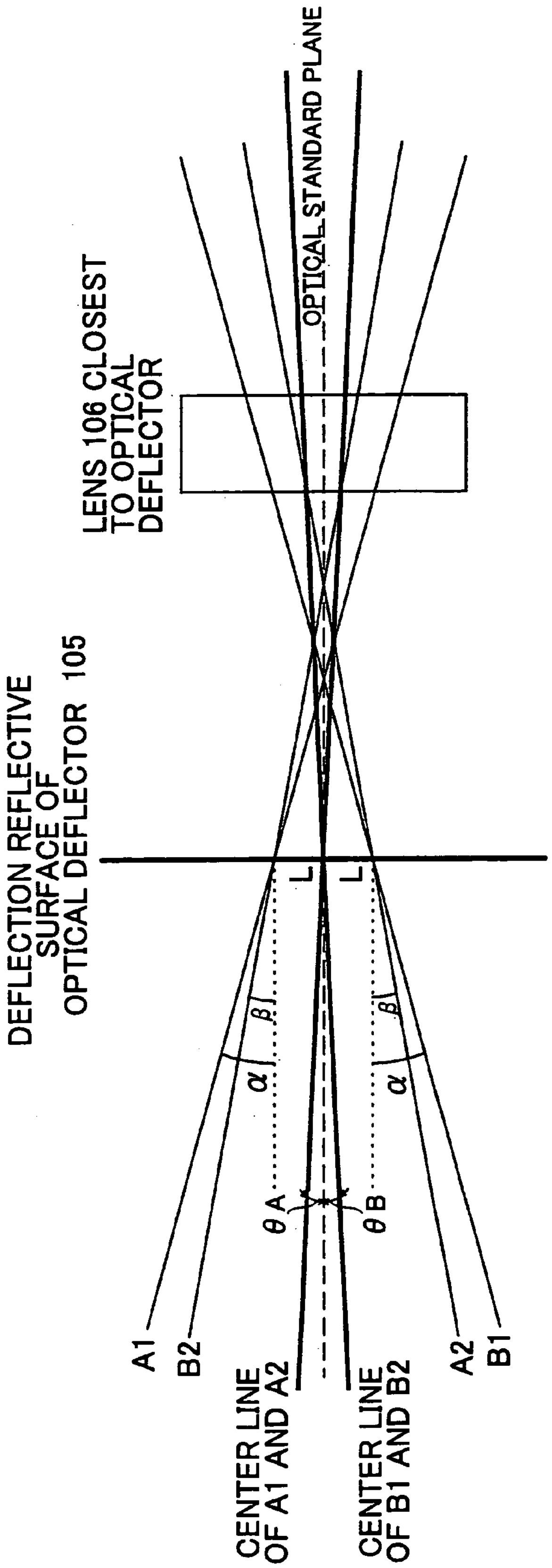
FIG. 19 shows a conceptual diagram of another example of the light beams from the light source units in the embodiment of the present invention.

Other than the example described above with reference to FIG. 2, a configuration shown in FIG. 19 may be provided in the embodiment of the present invention, instead. In FIG. 19, the light beams A1 and A2, emitted from the light sources of one light source unit, and the light beams B1 and B2, emitted from the light sources of the other light source unit, are shown.

As shown, the four light beams A1, A2, B1 and B2 are applied to the deflection reflective surface of the optical deflector 105 in such a manner that the center line of the two light beams A1 and A2 from one light source unit intersects with the optical standard plane at the angle θA, while the center line of the two light beams B1 and B2 from the other light source unit intersects with the optical standard plane at the angle θB, on the sub-scanning section. Thus, each of the center line of the two light beams A1 and A2 from one light source unit and the center line of the two light beams B1 and B2 from the other light source unit intersects with the optical standard plane from the direction different from each other in the sub-scanning direction.

Figure 13:
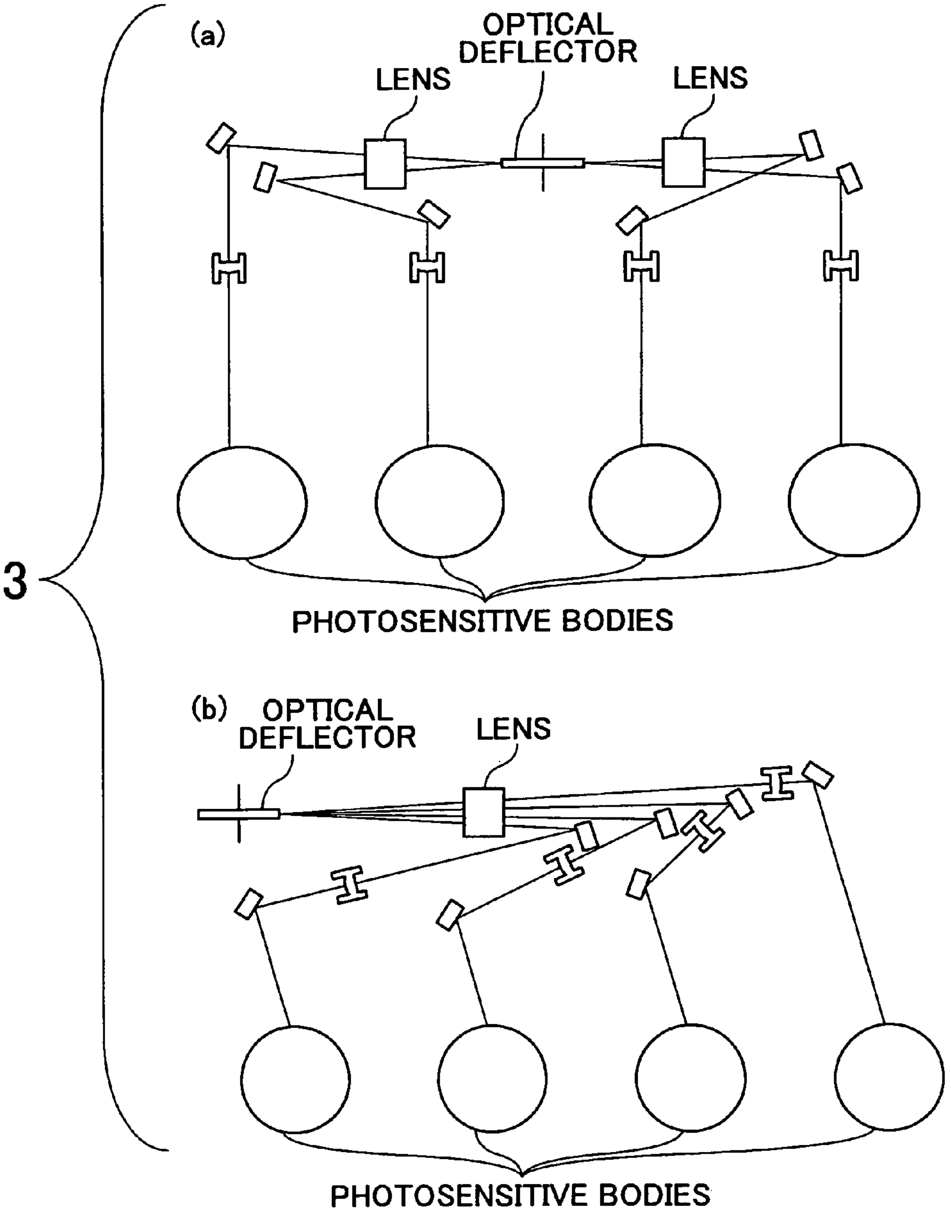
FIG. 13 shows general views of tandem type optical systems in the oblique entrance opposed scanning optical system and an oblique entrance single side scanning optical system.
Figure 14:
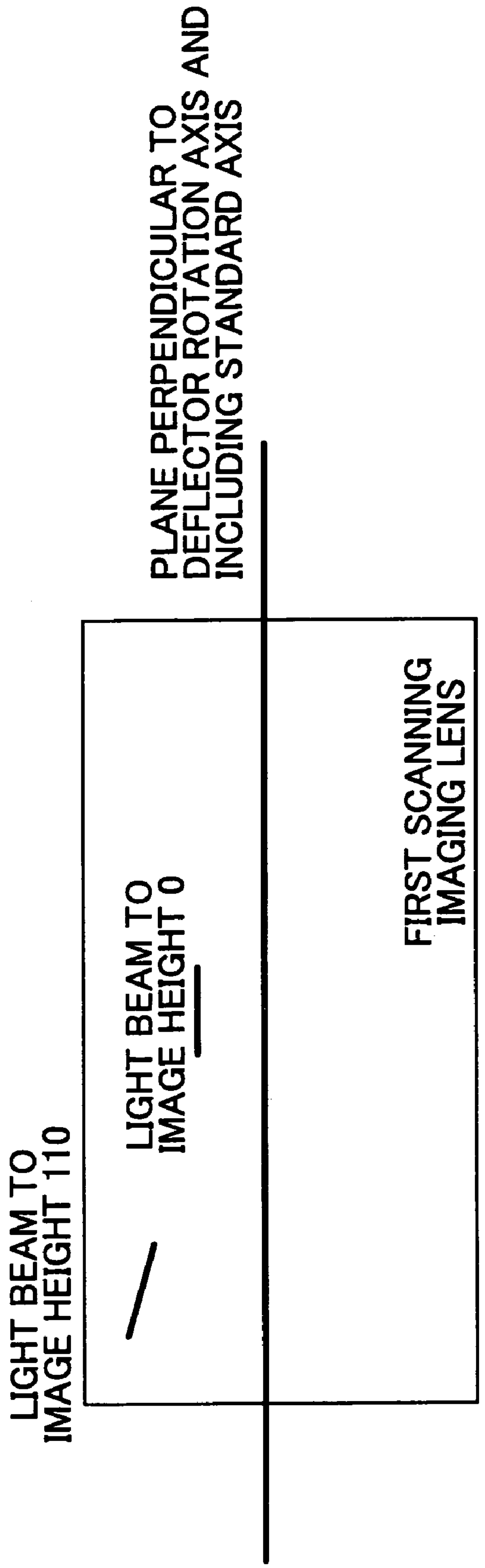
FIG. 14 illustrates wavefront aberration generating mechanism in the oblique entrance optical system.

Further, the light beams emitted by the light source units are reflected by the deflection reflective surface of the optical deflector 105 at respective points apart by equal distances from the intersection point between the deflection reflective surface and the optical standard plane. That is, as shown in FIG. 2 (*a*), (b) and FIG. 3 (*a*), the distance between the reflection point R1 and the intersection point is L, and also, the distance between the reflection point R2 and the intersection point is L. Thus, the reflection points are apart from the intersection point by the equal distances L to have the plane symmetrical relationship with respect to the optical standard plane. Thereby, as described above, in the tandem optical system as shown in FIG. 13 (*b*) for example, the light beams are applied also to the lens closest to the optical deflector 105 at positions in the plane symmetrical relationship as shown in FIGS. 2 (*a*), (b) and 3 (*a*), and thus, this lens can be produced to have a plane symmetrical shape with respect to the optical standard plane. Thus, simplicity in the lens configuration and sufficient imaging performance thereby can be achieved at the same time.

Further, in order to carry out decrease in the oblique entrance angle as mentioned above, the reflection points of the light beams from the common light source unit should preferably located opposite to one another with respect to the optical standard plane as shown in FIG. 3 (*a*). In comparison to a case where the light beams are applied to the same side with respect to the optical standard plane as shown in FIG. 3 (*b*), a larger angle margin between the light beams A1 and A2 in the sub-scanning direction can be provided in the case of FIG. 3 (*a*) in which the light beams are applied to the sides opposite with respect to the optical sandaled plane. As a result, the oblique entrance angle α or β can be further reduced. That is, in the case of FIG. 3 (*a*), the large margin is obtained by the distance 2L and thus, the oblique entrance angle α or β can be further reduced.

Further, when the intersection points between the light beams and the optical standard plane are set on the side of the imaging optical system with respect to the deflection reflective surface of the optical deflector 105 (right side) as shown in FIG. 2 (*a*), it is possible to advantageously reduce the lens height in the sub-scanning direction of the lens closest to the optical deflector 105. On the other hand, when these intersection points are set on the side of the light source units with respect to the deflection reflective surface of the optical deflector 105 (left side) as shown in FIG. 2 (*b*), it is possible to adventurously miniaturize the post-deflector optical system since separation of the light beams after the deflector can be made easier. However, when the intersection points are set just on the deflection reflective surface of the optical deflector 105, none of the above-mentioned advantages are obtained, and thus, such a setting may not be preferable in terms of the apparatus size reduction.

Figure 4:
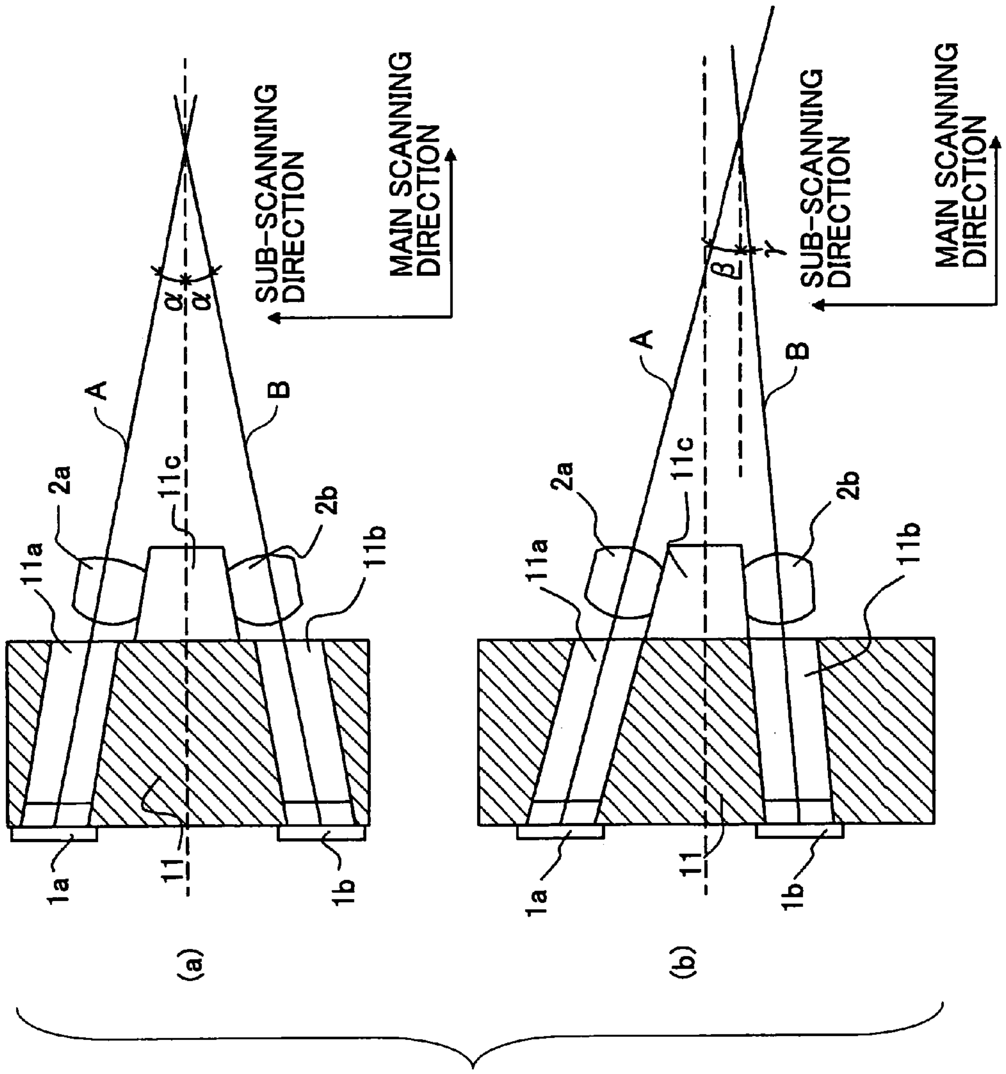
FIG. 4 shows sectional views of light source units in embodiments of the present invention.

FIG. 4 shows sectional views of the light source units in embodiments of the present invention. Figures show states in which semiconductor lasers 1*a*, 1*b* as the light sources, and corresponding coupling lenses 2*a*, 2*b* are mounted in a holder 11 in a fixed manner wherein mutual spatial relationship thereamong is adjusted. Light guiding holes 11*a*, 11*b* are provided in the holder 11 in such a manner that center lines thereof have a predetermined opening angle. This angle may be such that, as shown in FIG. 4 (*a*), equal angles α are provided with respect to the holder 11, or, such that, as shown in FIG. 4 (*b*), different angles β and γ are provided for the respective holes 11*a* and 11*b*. When the opening angle has the equal angles α (FIG. 4 (*a*)), the holder 11 itself should be set in an inclined manner by an angle θ (see FIG. 3 (*a*) for example) with respect to the optical standard plane in order that the oblique entrance angles of the corresponding two beams are made different from each other, so that, as shown in FIG. 2, the finally four mutually different angles are achieved for the respective four light beams (for the respective photosensitive bodies 3Y, 3M, 3C and 3K of FIG. 10, for example) from the two light source units 21 and 22 of FIG. 6 each of which may have a common configuration. When the light source units 21 and 22 thus have the common configurations, the light source units 21 and 22 can be manufactured easier.

The semiconductor lasers 1*a*, 1*b* are press-fitted into one end of the respective holes 11*a*, 11*b*. In the holder 11, on the side opposite to the side on which the semiconductor lasers 1*a*, 1*b* are thus press-fitted, lens holding parts 11*c* is provided to project as shown in FIG. 4. The coupling lenses 2*a*, 2*b* are held thereby in a fixed manner. An actual manner to fix the lenses to the lens holding part 11*c* is such that, for example, lens mounting positions are adjusted while the optical performance is monitored, and the lenses are fixed as a result of ultraviolet setting resin being set with application of ultraviolet ray. The coupling lenses 2*a*, 2*b* are thus fixed to the holder 11 in such a manner that the optical axes thereof are made coincident with the respective axes of the light guiding holes 11*a*, 11*b*. Light emitting points of the semiconductor lasers 1*a*, 1*b* press-fitted in the light guiding holes 11*a*, 11*b* are adjustable with respect to the holes 11*a*, 11*b*. By this adjustment, relative spatial relationship between the light emitting points of the respective semiconductor lasers 1*a*, 1*b* and the corresponding coupling lenses 2*a*, 2*b* can be thus appropriately adjusted.

By using a plurality of the light source units (21, 22, for example) each configured as described above, it is possible to configure a light source part suitable to a tandem optical system such as that shown in FIG. 13 (*b*), for example. In this case, in order to keep the symmetry of the light beams, it is preferable that the light beams from the different light source units are reflected at the common points on the optical deflector 105 (see FIG. 2, for example).

Further, when the plurality of the light source units are configured as described above, at least the light beams from the different light source units should be preferably applied to the optical deflector 105 at different angles in the main scanning direction. Further, when the light beams from the common light source unit are applied to the optical deflector 105 at different angles in the main scanning direction, the optical scanning apparatus can be further miniaturized and also can be made to provide higher performance.

When the light beams from the plurality of light source units are reflected at the same points on the optical deflector 105 in the embodiment as mentioned above, the light beams for imaging at the same image height on the to-be-scanned surface can be almost free from the influence of sag even when the light beams are applied at certain angles in the main scanning direction, and they can reach the lens almost through the same routes. In other words, the optical system in which variation in the performance hardly occurs among the light beams for the same image height can be achieved.

Further, it is possible to reduce the height of the light source units in the sub-scanning direction in comparison to a case where the light sources are disposed in one line in the sub-scanning direction. Thus, layout flexibility can be increased.

Figure 5:
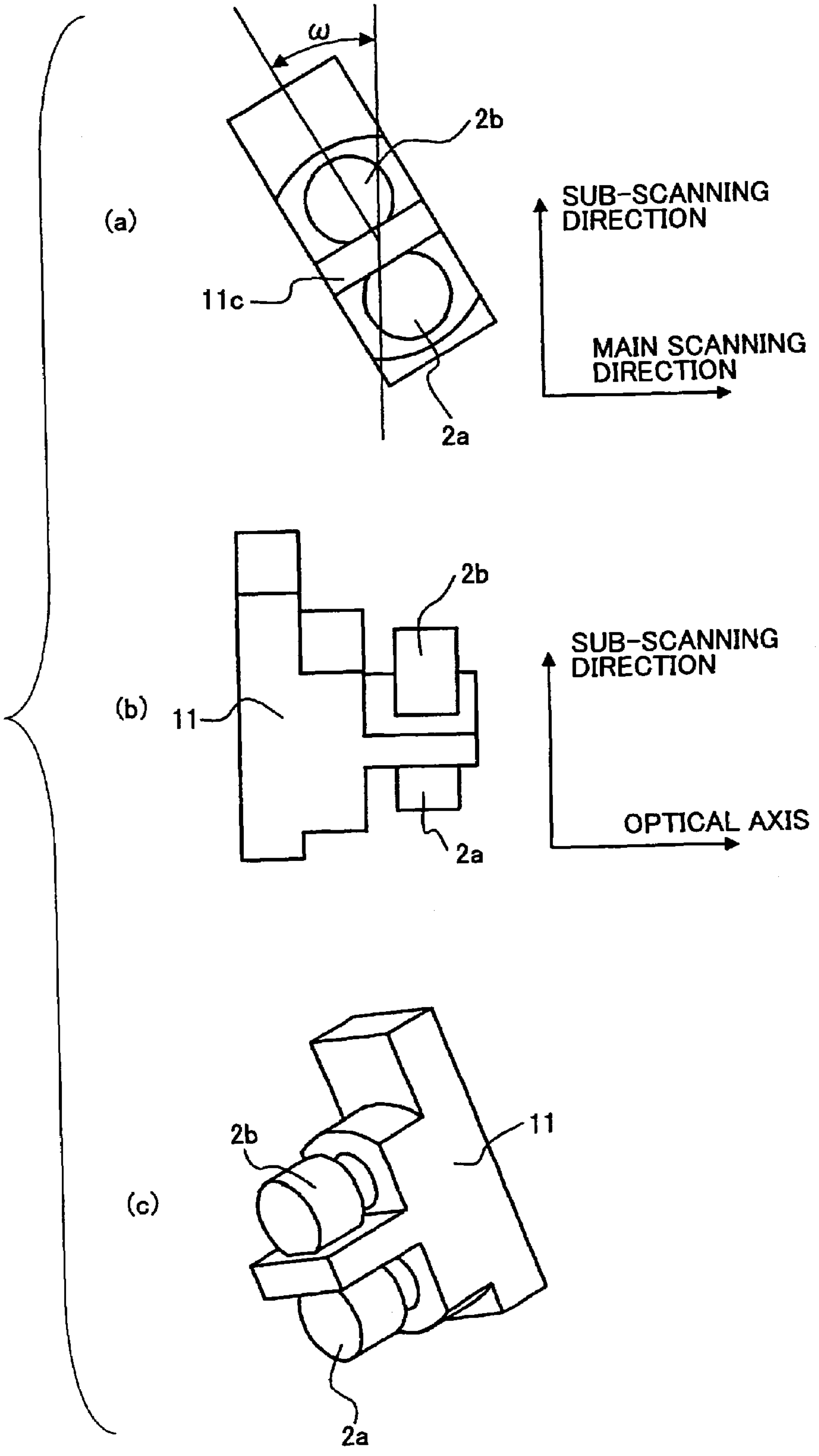
FIGS. 5 and 6 show sectional views and perspective views of light source units in embodiments of the present invention.

FIG. 5 shows one example of the light source unit according to an embodiment of the present invention in which the light beams can be applied to the optical deflector 105 at angles different also in the main scanning direction. FIG. 5 (*a*) shows a front sectional view taken along a sub-scanning direction in which the light source unit is rotated in the main scanning direction as shown. FIG. 5 (*b*) shows a side sectional view taken along the sub-scanning direction; and FIG. 5 (*c*) shows a perspective view. In this configuration, the holder 11 is rotated by an angle ω about the optical axis. By this configuration, the two light beams can be applied to the optical deflector 105 at a certain angle also in the main scanning direction therebetween (approximately 5° in this embodiment).

Figure 6:
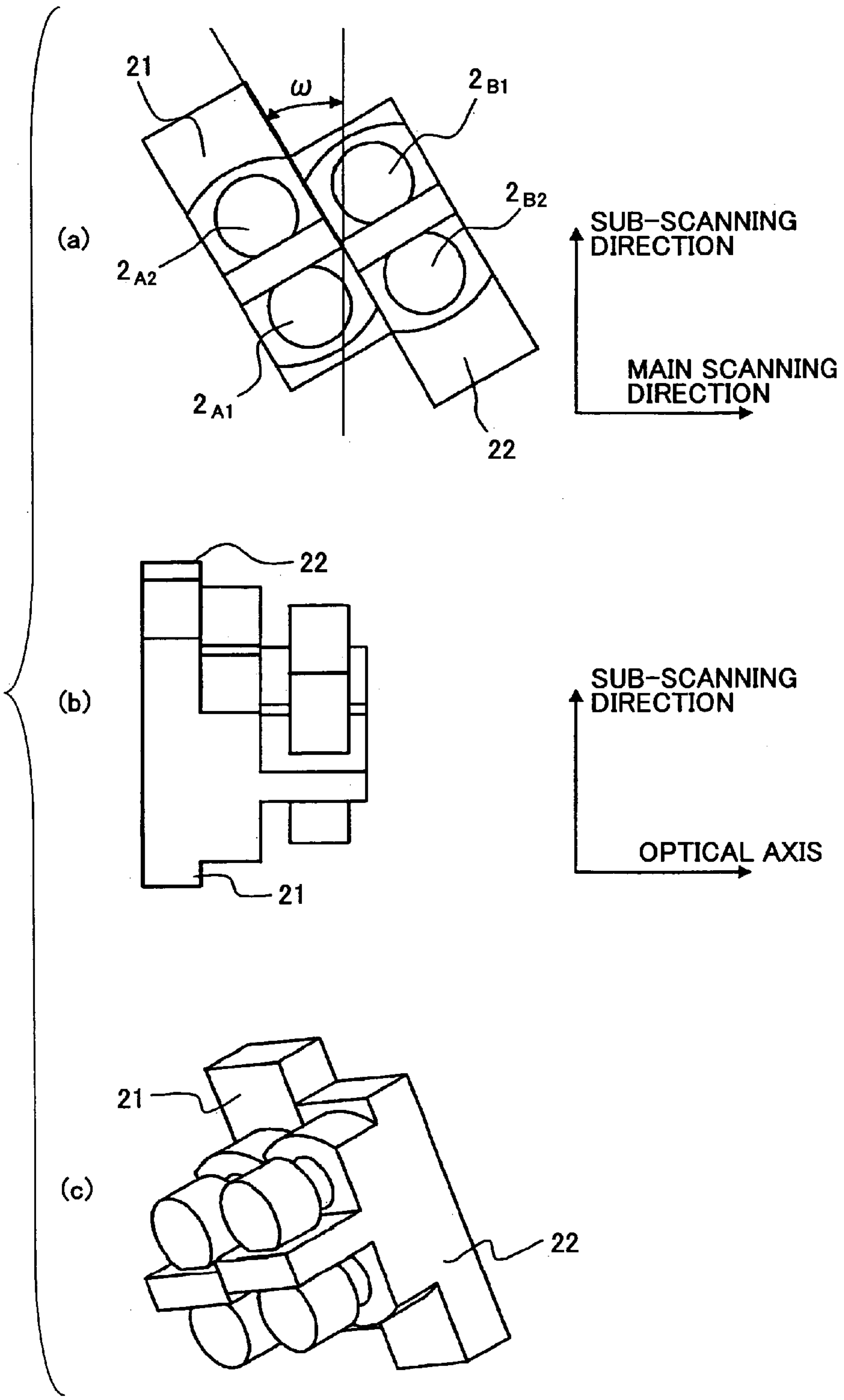

FIG. 6 shows a configuration in an embodiment of the present invention in which the two light source units 21 and 22 are combined for the tandem optical system. In this case, the plurality of light beams from the plurality of light source units 21 and 22 are applied to the optical deflector 105 at certain angles thereamong in the main scanning direction. Each of the light source units 21 and 22 is the same as the light source unit 11 shown in FIG. 5, and, is disposed in an axis symmetrical manner with respect to the optical axis. FIG. 6 (*a*) shows a front sectional view taken along the sub-scanning direction in which the light source units 21, 22 are rotated in the main scanning direction by an angle ω. FIG. 6 (*b*) shows a side sectional view taken along the sub-scanning direction; and FIG. 6 (*c*) shows a perspective view. In FIG. 6 (*a*), $\mathbf{2}_{A1}$, $\mathbf{2}_{A2}$, $\mathbf{2}_{B1}$, $\mathbf{2}_{B2}$ denote respective coupling lenses, corresponding to the respective four light beams. By configuring the light source units 21 and 22 as mentioned above, it is possible to produce the imaging optical system symmetrical with respect to the optical standard plane, and thus, it is possible to provide the imaging optical system having improved imaging performance even when they are applied in the tandem optical system. FIG. 6 shows the configuration in which the two light source units 21 and 22 have no spacing therebetween. However, it is also possible to configure, instead, so that the light source units 21 and 22 have a predetermined spacing therebetween as the necessity arises.

Figure 18:
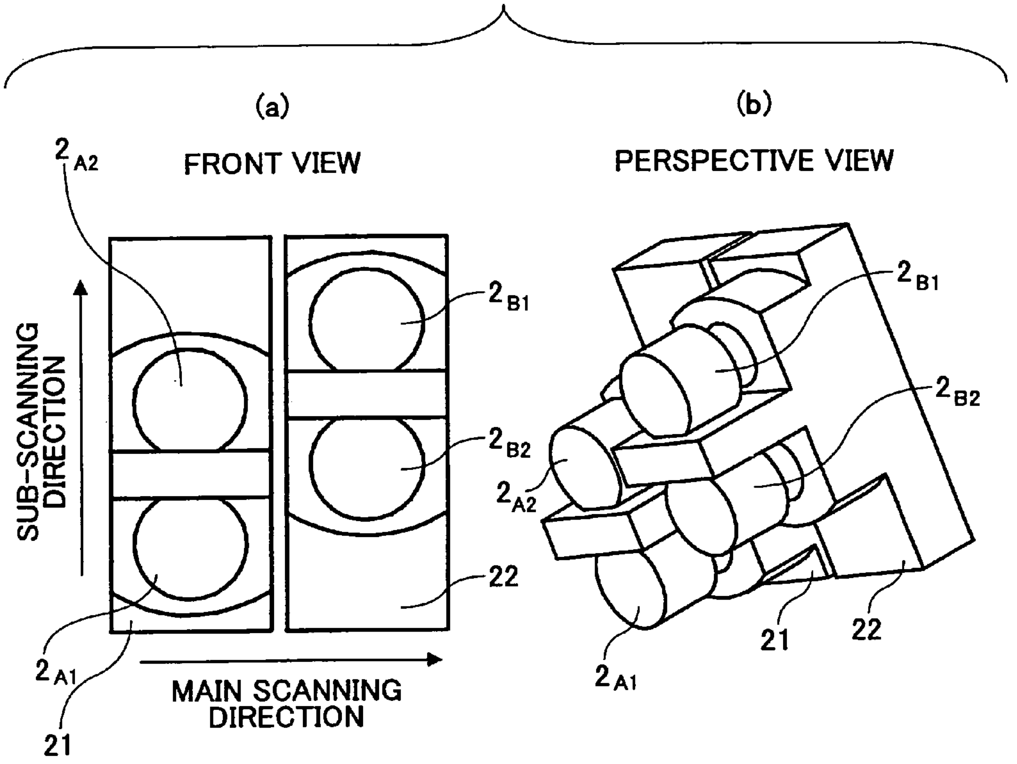
FIG. 18 shows a sectional view and a perspective view of light source units in another embodiment of the present invention.

FIG. 18 shows a variant embodiment of the light source units described above with reference to FIG. 6. In this embodiment, the combination of the light source units 21 and 22 are not rotated in the main scanning direction, as shown in FIG. 18 (*a*) which shows a front sectional view in the sub-scanning direction (corresponding to FIG. 6 (*a*)). FIG. 18 (*b*) shows a perspective view of this embodiment. Also in this embodiment, in FIG. 18 (*a*), the heights in the sub-scanning direction are different among the coupling lenses $\mathbf{2}_{A1}$, $\mathbf{2}_{A2}$, $\mathbf{2}_{B1}$ and $\mathbf{2}_{B2}$, and, as a result, the corresponding respective light beams A1, A2, B1 and B2 are emitted from the combination of the light source units 21 and 22 at angles different from each other in the sub-scanning direction. Further, as mentioned above, each of the light source unit 21 and 22 has the same configuration as that shown in FIG. 4 so that the corresponding light beams are emitted from the light source unit 21 or 22 at the above-mentioned opening angle therebetween (2α or β+γ). As a result, these light beams are applied to the optical deflector 105 at angles different in the sub-scanning direction so that the configuration of the combination of the light source units in this embodiment is also suitable to the tandem optical system as in the embodiment described above with reference to FIG. 6.

Figure 15:
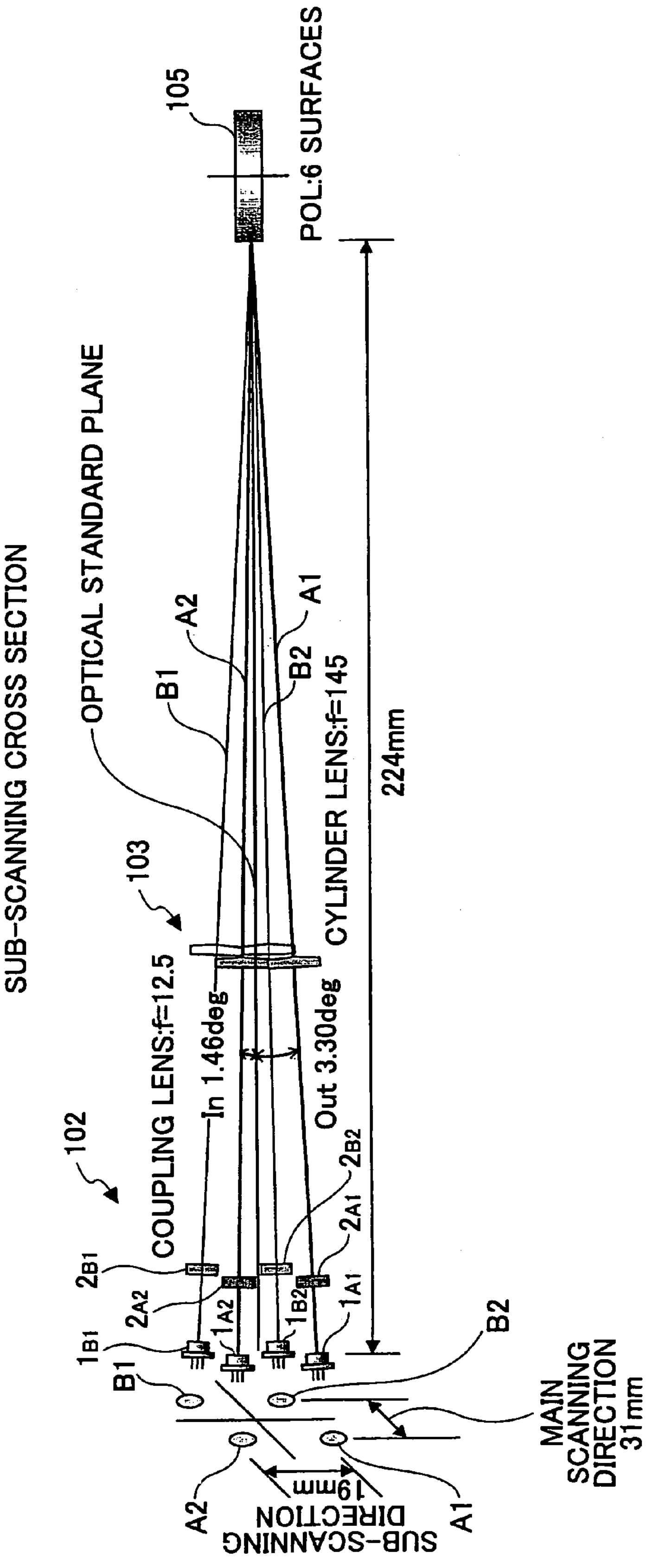
FIG. 15 shows inclination of light sources according to an embodiment of the present invention.

FIG. 15 shows an arrangement of the respective light sources $\mathbf{1}_{A1}$, $\mathbf{1}_{A2}$, $\mathbf{1}_{B1}$ and $\mathbf{1}_{B2}$, the corresponding coupling lenses $\mathbf{2}_{A1}$, $\mathbf{2}_{A2}$, $\mathbf{2}_{B1}$ and $\mathbf{2}_{B2}$, and the light beams A1, A2, B1 and B2 applied to the deflection reflective surface of the optical deflector 105, in an embodiment of the present invention. This configuration corresponds to each of the configurations described above with reference to FIG. 6 and FIG. 18, suitable to the tandem optical system.

FIG. 16 shows a configuration corresponding to the configuration FIG. 15. In FIG. 16, as shown, the above-mentioned light source units 21 and 22 are shown on which the respective light sources $\mathbf{1}_{A1}$, $\mathbf{1}_{A2}$, $\mathbf{1}_{B1}$ and $\mathbf{1}_{B2}$ are mounted as shown FIG. 6 or 18, so that the respective light sources $\mathbf{1}_{A1}$, $\mathbf{1}_{A2}$, $\mathbf{1}_{B1}$ and $\mathbf{1}_{B2}$ are thus appropriately disposed in the optical scanning apparatus.

As shown in FIGS. 15 and 16, according to the embodiment of the present invention, the respective light sources $\mathbf{1}_{A1}$, $\mathbf{1}_{A2}$, $\mathbf{1}_{B1}$ and $\mathbf{1}_{B2}$ are disposed in such a manner that the light sources $\mathbf{1}_{A1}$, $\mathbf{1}_{A2}$, $\mathbf{1}_{B1}$ and $\mathbf{1}_{B2}$ are at the heights mutually different in the sub-scanning direction and are themselves each inclined appropriately so that the light beams A1, A2, B1 and B2 emitted from the light sources $1_{A1}$, $1_{A2}$, $1_{B1}$ and $1_{B2}$ are then applied to the predetermined different points on the deflection reflective surface of the optical deflector 105 suitable to the tandem optical system. That is, when these four light beams A1, A2, B1 and B2 are then reflected by the deflection reflective surface of the optical deflector 105, these light beams go positively separately for the respective photosensitive bodies (for example, those 3Y, 3M, 3C and 3K shown in FIG. 10) after passing through the scanning imaging lenses.

FIG. 17 shows an arrangement of the respective light sources 1*a* and 2*b*, the corresponding coupling lenses 2*a* and 2*b*, and the light beams A and B applied to the deflection reflective surface of the optical deflector 105, in another embodiment of the present invention. This configuration corresponds to the configuration described above with reference to FIG. 5. However, in the embodiment of FIG. 17, the holder 11 on which the light sources 1*a* and 2*b*, as well as the corresponding coupling lenses 2*a* and 2*b* are mounted is not rotated in the main scanning direction. However, in this case, the same as the above, the respective light sources 1*a*, 1*b* are disposed in such a manner that the light sources 1*a*, 1*b* are at the heights different in the sub-scanning direction and are themselves each inclined appropriately so that the light beams A and B emitted from the light sources 1*a* and 1*b* are then applied to the predetermined different points on the deflection reflective surface of the optical deflector 105.

Next, an embodiment of the present invention will now be described in a form of an optical scanning apparatus for a tandem type color image forming apparatus in one example of a single side scanning optical system.

Figure 7:
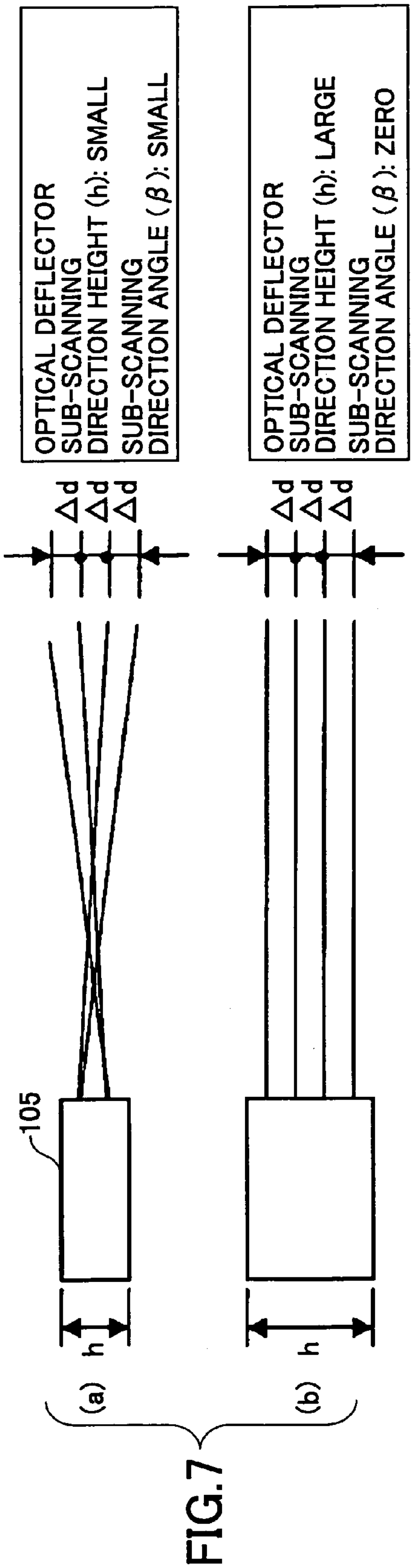
FIG. 7 shows relationship between polygon mirrors and entrance light beams in a horizontal opposed scanning system and an oblique entrance opposed scanning system.

In the single side scanning optical system, satisfactory optical performance is obtained in an optical scanning apparatus in the related art when, as shown in FIG. 7 (*b*), all the light beams are applied to a deflection reflective surface of a polygon mirror (optical deflector) in parallel to a normal of the deflection reflective surface. However in this case, in order to positively separate the respective light beams to be led to respective different to-be-scanned surfaces (photosensitive bodies), predetermined spacing Δd (commonly, 3 mm through 5 mm) should be provided among the light beams applied to the respective to-be-scanned surfaces. For this purpose, the height of the polygon mirror should be increased accordingly, the contact areas with air may increase accordingly, driving power consumption may increase due to the window loss, noise may increase, and the cost may increase accordingly. Especially, the ratio in the cost of the polygon mirror in the total cost of the optical scanning apparatus is relatively high, and thus, a problem may actually occur costwise.

Figure 12:
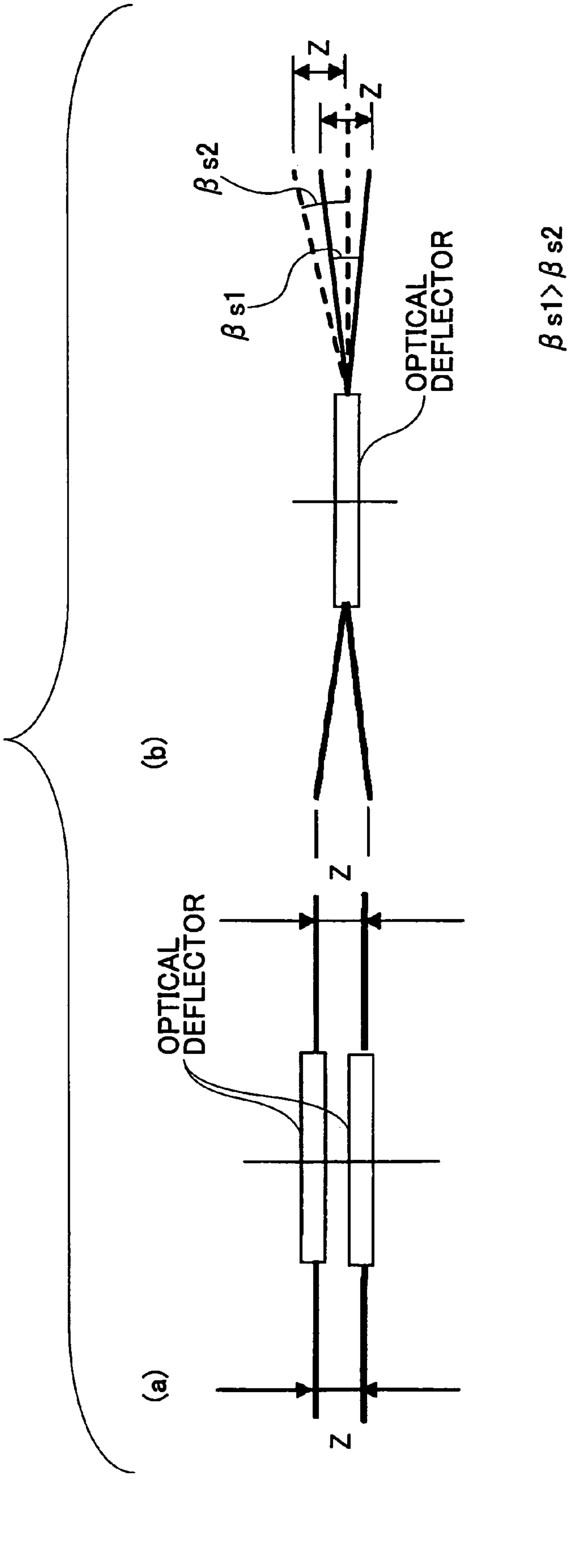
FIG. 12 shows relationship between polygon mirrors and entrance light beams in the horizontal opposed scanning system and the oblique entrance opposed scanning system.

In contrast thereto, in the optical scanning apparatus according to the embodiment of the present invention, configured as described above, the light beams originally emitted by the above-mentioned plurality of light source units 21 and 22 reflected by the deflection reflective surface of the polygon mirror (optical deflector 105) have certain angles in the sub-scanning direction with respect to the normal of the deflection reflective surface of the polygon mirror 105, and then, are applied to the scanning imaging lens 106. Accordingly, as shown in FIG. 7 (*a*), it is possible to remarkably reduce the required height h in the sub-scanning direction of the polygon mirror 105. Accordingly, the same as in the opposed scanning system, the polyhedron of the polygon mirror 105 acting as the deflection reflective surfaces can be provided in a single stage, with a reduced thickness in the sub-scanning direction, the inertia of the polygon mirror 105 as a body of rotation can be reduced, and a time required to start up can be shortened accordingly. Further, in comparison to the related art in which the two stages of the polygon mirror is applied as shown in FIG. 12 (*a*), cost reduction can be positively achieved.

However, as described above, generally speaking, in such an oblique entrance scanning optical system (see FIG. 7 (*a*)), in comparison to the horizontal entrance system (see FIG. 7 (*b*)) in the related art, light beams are applied to the scanning lens in such a manner that they have certain angles (i.e., not parallel) in the sub-scanning direction, and aberration amounts increase and optical performance degrade accordingly. In order to solve the problems, in the embodiment of the present invention, in order to solve the problem, the optical performance is corrected by employing special toroidal surfaces for the scanning imaging lenses 106 and 107 as will be described later. Further, the angles with respect to the normal of the deflection reflective surface of the polygon mirror 105, at which the light beams are obliquely applied to the deflection reflective surface of the polygon mirror 105, are reduced. Thereby, it is possible to control the degradation in the optical performance, and to finally achieve satisfactory optical performance. As a result, in the embodiment of the present invention, it is possible to obtain a stable beam spot on the to-be-scanned surface, and thereby, the configuration of the embodiment of the present invention is advantageous also in terms of image quality improvement thanks to the miniaturization of the beam spot diameter.

The above-mentioned special toroidal surface will now be described. A surface profile of the special toroidal surface is expressed by the following profile formula:

$$X(Y) = \frac{Y^2 \cdot Cm}{1 + \sqrt{[1 - (1 + K) \cdot (Y \cdot Cm)^2]}} + A4 \cdot Y^4 + A6 \cdot Y^6 + A8 \cdot Y^8 + A10 \cdot Y^{10} \ldots$$

$$Cs(Y) = \frac{1}{\{Rs(0) + \sum bj \cdot Y^j\}} \quad (j = 1, 2, 3 \ldots)$$

There, RY denotes a paraxial curvature radius in a main scanning cross section which is a plane cross section parallel to the main scanning direction and including the optical axis; Y denotes a distance in the main scanning direction from the optical axis; A4, A6, A8 and A10 denote high-order coefficients; RZ denotes a paraxial curvature radius in a sub-scanning cross section which perpendicularly interests with the main scanning cross section; and Cs(Y)=1/RZ.

However, the special toroidal surface employed in the embodiment of the present invention is not limited thereto, and the same shape may be specified also by another profile formula.

Figure 8:
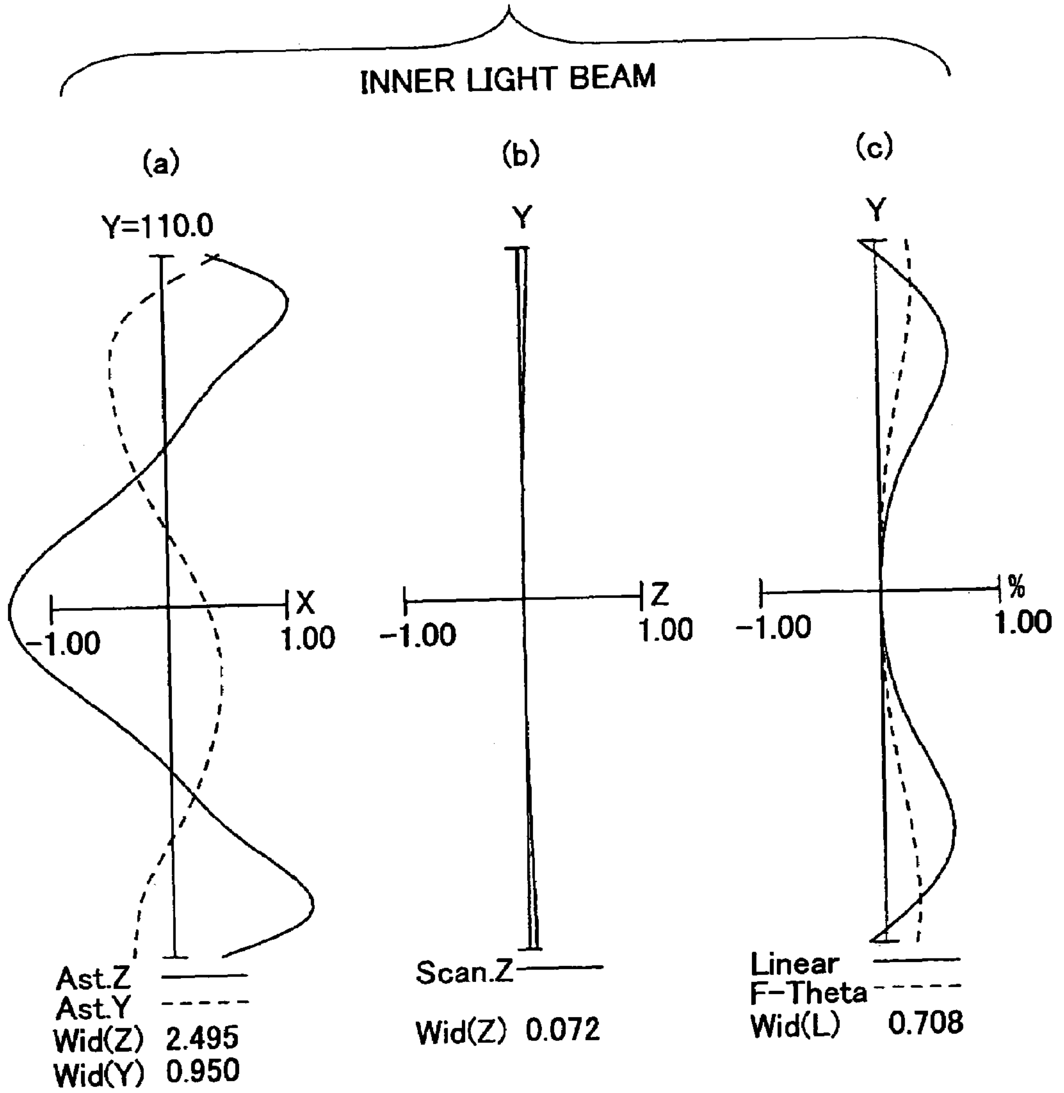
FIG. 8 shows aberration curves of an inner light beam.
Figure 9:
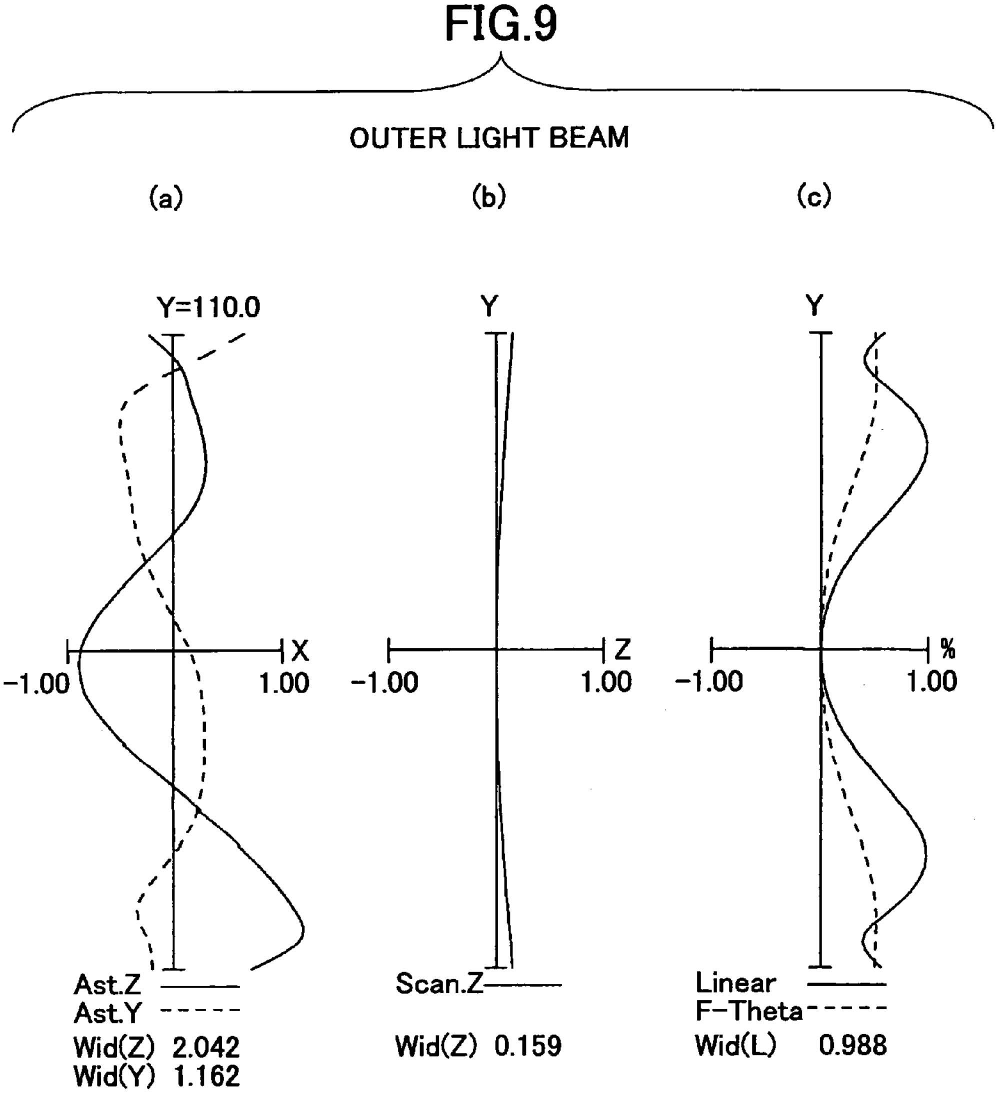
FIG. 9 shows aberration curves of an outer light beam.

FIGS. 8 and 9 show optical characteristics of the optical scanning apparatus according to the embodiment of the present invention. FIG. 8 shows those for an inner light beam, FIG. 9 shows those for an outer light beam. The imaging optical system of the optical scanning apparatus in the embodiment of the present invention has the following configuration:

design wavelength: 780 nm;

scanning width: 220 mm;

polygon inscribing circle diameter: 13 mm;

the number of polygon surfaces: 6;

polygon entrance angle: 60.0° in the main scanning direction; and 1.46° for the inner light beam and 3.30° for the outer light beam in the sub-scanning direction;

For the inner light beam, TABLE 1 shows the details;

For the outer light beam, TABLE 2 shows the details;

For the aspherical coefficients of the first scanning imaging lens 106, TABLE 3 shows the details;

For the aspherical coefficients of the second scanning imaging lens 107, TABLE 3 shows details;

TABLE 1

| INNER LIGHT BEAM (ENTRANCE ANGLE: 1.46°) | | | | | |
|---|---|---|---|---|---|
| SURFACE NUMBER | RY(mm) | RZ(mm) | X(mm) | N | NOTE |
| DEFLECTION SURFACE | ∞ | ∞ | | — | DEFLECTION SURFACE |
| 1* | −765.000 | ∞ | 5.00 | 1.5240 | FIRST SCANNING IMAGING LENS |
| 2* | −114.717 | ∞ | 161.00 | — | |
| 3* | −7650.000 | 34.575 | 3.00 | 1.5240 | SECOND SCANNING IMAGING LENS |
| 4 | 2057.754 | ∞ | 97.73 | — | |
| 5 | — | — | — | — | TO-BE-SCANNED SURFACE |

TABLE 2

| OUTER LIGHT BEAM (ENTRANCE ANGLE: 3.30°) | | | | | |
|---|---|---|---|---|---|
| SURFACE NUMBER | RY(mm) | RZ(mm) | X(mm) | N | NOTE |
| DEFLECTION SURFACE | ∞ | ∞ | | — | DEFLECTION SURFACE |
| 1* | −765.000 | ∞ | 5.00 | 1.5240 | FIRST SCANNING IMAGING LENS |
| 2* | −114.717 | ∞ | 161.00 | — | |
| 3* | −7650.000 | 34.707 | 3.00 | 1.5240 | SECOND SCANNING IMAGING LENS |
| 4 | 1884.834 | ∞ | 97.73 | — | |
| 5 | — | — | — | — | TO-BE-SCANNED SURFACE |

TABLE 3

| ASPHERICAL COEFFICIENT (FIRST SCANNING IMAGING LENS) | | |
|---|---|---|
| | FIRST SURFACE | SECOND SURFACE |
| RY | −765.000 | −114.717 |
| K | 0.000 | 0 |
| A4 | $-5.01156 \times 10^{-7}$ | $-7.83227 \times 10^{-8}$ |
| A6 | $1.91364 \times 10^{-9}$ | $1.01891 \times 10^{-9}$ |
| A8 | $-4.76701 \times 10^{-12}$ | $-1.81952 \times 10^{-12}$ |
| A10 | — | $2.04692 \times 10^{-15}$ |
| RZ | ∞ | ∞ |
| B2 | $2.62701 \times 10^{-4}$ | $2.19837 \times 10^{-4}$ |
| B4 | $-1010168 \times 10^{-7}$ | $5.00535 \times 10^{-8}$ |
| B6 | $3.82783 \times 10^{-10}$ | $2.17043 \times 10^{-10}$ |
| B8 | $3.78340 \times 10^{-13}$ | $2.46405 \times 10^{-13}$ |
| B10 | $3.17419 \times 10^{-16}$ | $9.10197 \times 10^{-16}$ |

TABLE 4

| ASPHERICAL COEFFICIENT (SECOND SCANNING IMAGING LENS) | | |
|---|---|---|
| | THIRD SURFACE | FOURTH SURFACE |
| INNER LIGHT BEAM (ENTRANCE ANGLE: 1.46°) | | |
| RY | −7650.000 | 2057.754 |
| K | 0.000 | 0.000 |
| A4 | $7.45831 \times 10^{-8}$ | $3.04701 \times 10^{-8}$ |
| A6 | $-4.26286 \times 10^{-11}$ | $-3.81051 \times 10^{-11}$ |
| A8 | $5.66751 \times 10^{-15}$ | $4.90482 \times 10^{-15}$ |
| A10 | $-2.25893 \times 10^{-19}$ | $1.84090 \times 10^{-19}$ |
| RZ | 34.575 | ∞ |
| B1 | $-3.98994 \times 10^{-7}$ | — |
| B2 | $-9.45192 \times 10^{-7}$ | — |
| B3 | $3.68489 \times 10^{-10}$ | — |
| B4 | $3.11863 \times 10^{-10}$ | — |
| B5 | $-4.48296 \times 10^{-14}$ | — |
| B6 | $-1.03973 \times 10^{-13}$ | — |
| B7 | — | — |
| B8 | $1.76956 \times 10^{-17}$ | — |
| B9 | — | — |
| B10 | $1.11545 \times 10^{-21}$ | — |
| OUTER LIGHT BEAM (ENTRANCE ANGLE: 3.30°) | | |
| RY | −7650.000 | 1884.834 |
| K | 0.000 | 0.000 |
| A4 | $-7.00003 \times 10^{-8}$ | $3.58297 \times 10^{-8}$ |
| A6 | $-3.98297 \times 10^{-11}$ | $-3.61707 \times 10^{-11}$ |
| A8 | $-5.48949 \times 10^{-15}$ | $4.63056 \times 10^{-15}$ |
| A10 | $-2.34995 \times 10^{-19}$ | $-1.78777 \times 10^{-19}$ |
| RZ | 34.707 | ∞ |
| B1 | $-1.77530 \times 10^{-6}$ | — |
| B2 | $-7.60817 \times 10^{-7}$ | — |
| B3 | $1.63116 \times 10^{-9}$ | — |
| B4 | $1.09690 \times 10^{-10}$ | — |
| B5 | $-1.92581 \times 10^{-13}$ | — |
| B6 | $-8.80894 \times 10^{-15}$ | — |
| B7 | — | — |
| B8 | $8.15575 \times 10^{-19}$ | — |
| B9 | — | — |
| B10 | $1.29750 \times 10^{-22}$ | — |

The above-mentioned holes 11*a* and 11*b* of the holder 11 in which the two light sources 1*a* and 1*b* are press-fitted are inclined with respect to the optical axis at 2.38° each in opposite directions, and an angle between these holes 11*a* and 11*b* is 4.76°. The light source unit is inclined at 0.92° in the sub-scanning direction. The light source units 21 and 22 each thus inclined at 0.92° are set as shown in FIG. 6 (*a*). As a result, with reference to FIG. 2, the oblique entrance angle α of the outer light beam is set 3.30°; the oblique entrance angle β of the inner light beam is set 1.46°; the distance L of the reflection point on the optical deflector from the optical standard plane is set 0.1 mm. In each of FIGS. 8 and 9, (a) shows curvatures in the main scanning direction and in the sub-scanning direction; (b) shows scanning line bending; and (c) shows fθ characteristics and linearity. As can be seen therefrom, the optical performance is satisfactorily corrected in the embodiment of the present invention.

In another embodiment of the present invention, it is possible that, in a multi-beam optical scanning apparatus employing a semiconductor laser array having a plurality of light emitting points, the corresponding plurality of light beams are simultaneously applied to a photosensitive body surface(s). Thereby, it is possible to provide the optical scanning apparatus and an image forming apparatus employing the same in which high operation speed and high writing density are achieved. Also in this case, by applying the configuration of the optical scanning apparatus in the embodiment of the present invention in which the combination of the light source units 21 and 22 are provided as described above with reference to the figures including FIG. 6 or 18, or the holder 11 described above with reference to the figures including FIG. 5 or FIG. 17, to achieve the oblique entrance scanning optical system, the same advantages as those mentioned above can be also obtained.

Figure 10:
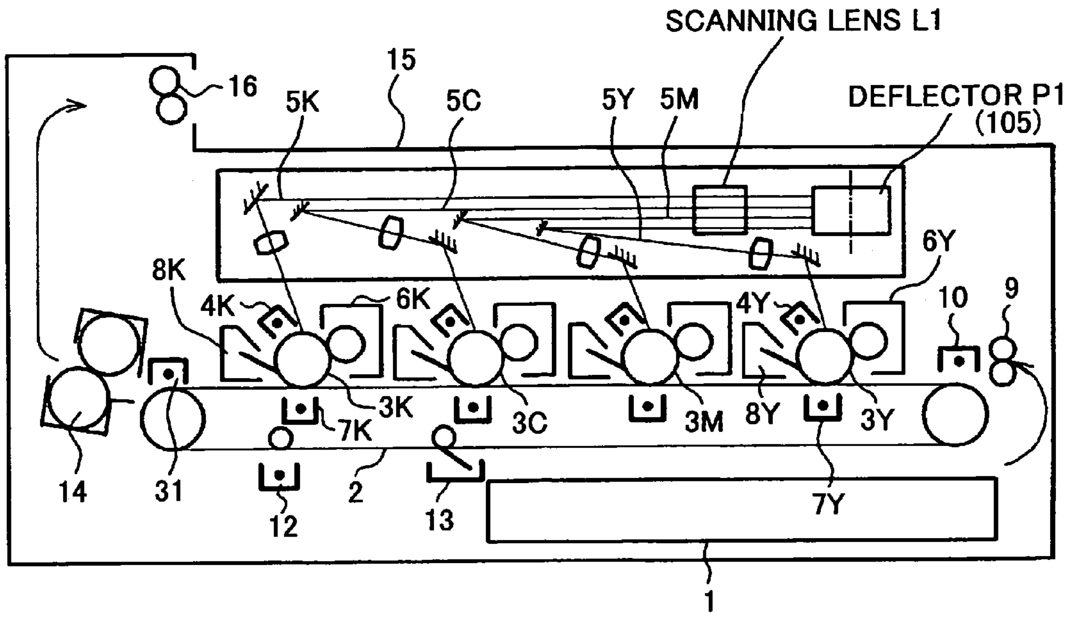
FIG. 10 shows a general view of an image forming apparatus according to an embodiment of the present invention.
Figure 11:
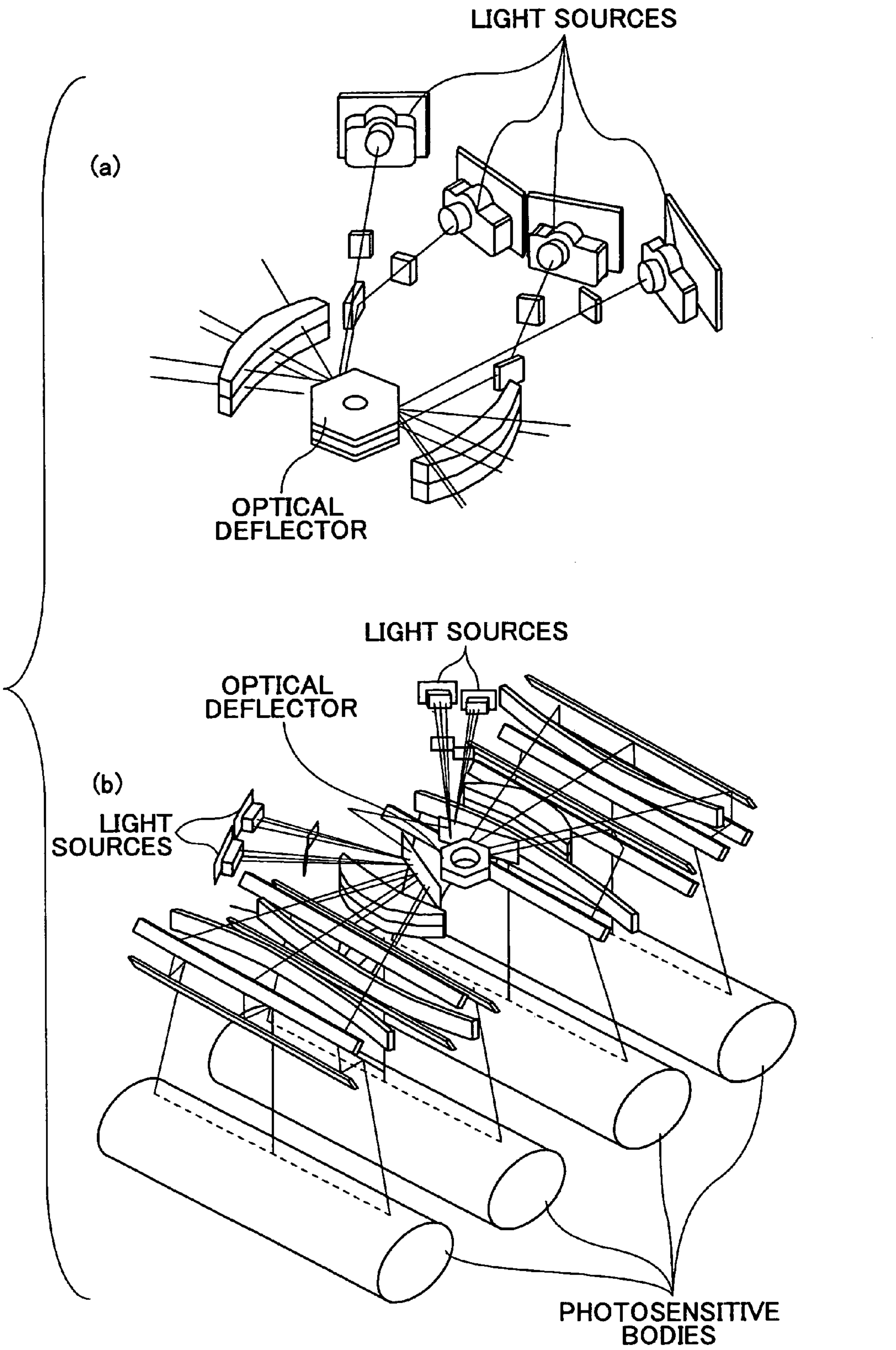
FIG. 11 shows an optical scanning apparatus in a horizontal opposed scanning system.

With reference to FIG. 10, an example of an image forming apparatus in which the optical scanning apparatus according to the embodiment of the present invention is employed will now be described.

As shown in FIG. 10, the image forming apparatus according to the embodiment of the present invention is a tandem type full color laser printer employing the optical scanning apparatus according to the embodiment of the present invention. The image forming apparatus includes a paper feeding cassette 1, a conveyance belt 2, photosensitive bodies 3Y, 3M, 3C and 3K, electricity chargers 4Y, 4M, 4C and 4K, optical scanning apparatuses 5Y, 5M, 5C and 5K, developing apparatuses 6Y, 6M, 6C and 6K, transfer chargers 7Y, 7M, 7C and 7K, a photosensitive body clearing apparatus 8, a registration roller 9, a belt electricity charger 10, a belt separating charger 31, a electricity removal charger 12, a conveyance belt cleaning apparatus 13, a fixing apparatus 14, a paper ejecting tray 15 and a paper ejecting roller 16. The optical scanning apparatuses 5Y, 5M, 5C and 5K include a scanning lens L1 and an optical deflector P1. It is noted that, in FIG. 10, the reference numerals 5Y, 5M, 5C and 5K merely indicate light beams generated by the respective optical scanning apparatuses 5Y, 5M, 5C and 5K, for the purpose of avoiding complicatedness. Actually, the reference numerals 5Y, 5M, 5C and 5K denote the respective optical scanning apparatuses themselves. The suffixes, i.e., Y, M, C and K, of the reference numerals denote the respective parts for yellow, magenta, cyan and black color components.

In a bottom part of the apparatus, the conveyance belt 2 is provided to convey transfer paper fed by the paper feeding cassette 1, and, is disposed horizontally. Above he conveyance belt 2, the photosensitive bodies 3Y, 3M, 3C and 3K are disposed at equal intervals in the stated order from the upstream of the transfer paper conveyance direction. These photosensitive bodies have equal diameters, and respective process members which carry out respective processes of a known electrophotographic process are disposed in a predetermined order around the photosensitive bodies, respectively. For example, for the photosensitive body 3Y, the electricity charger 4Y, the optical scanning apparatus 5Y, the developing apparatus 6Y, the transfer charger 7Y, the photosensitive body cleaner 8Y and so forth are disposed in the order. That is, in the image forming apparatus in the embodiment of the present invention, the respective surfaces of the photosensitive bodies 3Y, 3M, 3C and 3K act as the respective to-be-scanned surfaces or to-be-beam-applied surfaces, and for the photosensitive bodies 3Y, 3M, 3C and 3K, the optical scanning apparatuses 5Y, 5M, 5C and 5K are provided, respectively, in a one-to-one correspondence manner. However, in the scanning lens L1 is shared in common for the yellow, magenta, cyan and black color components. Around the conveyance belt 2, the registration roller 9 and the belt electricity charger 10 are provided at a position on the upstream side of the photosensitive body 5Y in the belt rotation direction. On the downstream side of the photosensitive body 5Y, the fixing apparatus 14 is provided, and the paper ejecting roller 16 couples the fixing apparatus 14 with the paper ejecting tray 15.

In this configuration, for full color mode (a mode of plurality of colors) for example, based on image signals of the respective color components of yellow, magenta, cyan and black, the respective photosensitive bodies 3Y, 3M, 3C and 3K are scanned by the respective light beams by means of the corresponding optical scanning apparatuses 5Y, 5M, 5C and 5K, and thus, electrostatic latent images are produced on the surfaces of the respective photosensitive bodies. These electrostatic latent images are developed by the respective corresponding color toners into respective toner images, which are then transferred one by one in sequence to the transfer paper which is electrostatically absorbed onto the conveyance belt 2, so that the respective toner images are superposed with each other for a full color image thus produced on the transfer paper. The full color image is then fixed by means of the fixing apparatus 14 to the transfer paper, and then, is ejected to the paper ejecting tray 15 by the paper ejecting roller 16.

As a result of the optical scanning apparatus according to the embodiment of the present invention described above being thus applied as each of the optical scanning apparatuses 5Y, 5M, 5C and 5K, it is possible to positively correct scan line bending and degradation in the wavefront aberration, and thus, it is possible to achieve an image forming apparatus by which high quality image reproduction can be ensured. The description has been made with reference to FIG. 10 employing the optical scanning apparatus in the single side scanning optical system. However, when an optical scanning apparatus in the opposed scanning optical system is employed, an image forming apparatus in an embodiment of the present invention may also be configured in the same manner.

Further, the present invention is not limited to the above-described embodiments, and variations and modifications may be made without departing from the basic concept of the present invention claimed below.

The present application is based on Japanese Priority Application No. 2005-227276, field on Aug. 4, 2005, the entire contents of which are hereby incorporated herein by reference.

What is claimed is:

1. An optical scanning apparatus, comprising:

a light source part comprising a plurality of light sources configured to scan respective different targets, and coupling lenses corresponding thereto, respectively;

a deflecting part configured to deflect light beams from said plurality of light sources; and an imaging part configured to form images on said respective targets with the light beams, wherein:

said light source part comprises a light source unit in which said plurality of light sources, that respectively emit the light beams at angles different in a sub-scanning direction with respect to an optical standard plane, parallel to a main scanning direction and passing through a standard axis of a surface shape of a lens of said imaging part, which lens is closest to said deflecting part, said light beams being applied to said deflecting part at angles different in the sub-scanning direction, are integrally provided;

said plurality of light sources are inclined so that said plurality of light sources thus respectively emit the light beams at the angles different in the sub-scanning direction with respect to the optical standard plane; and said light source part is configured in such a manner that said plurality of light sources emit the light beams which are applied to said deflecting part at angles different from each other also in the main scanning direction.

2. The optical scanning apparatus as claimed in claim 1, wherein:

reflection points of the light beams on said deflecting part, which beams are emitted by said plurality of light sources, are apart by equal distances from an intersection point between a reflective surface of said deflecting part and said optical standard plane.

3. The optical scanning apparatus as claimed in claim 1, wherein:

said light source part comprises a plurality of light source units; and reflection points of the light beams on said deflecting part, which beams are emitted by said plurality of light sources, are apart by equal distances from an intersection point between a reflective surface of said deflecting part and said optical standard plane.

4. The optical scanning apparatus as claimed in claim 1, wherein:

reflection points of the light beams on said deflecting part, which beams are emitted by said plurality of light sources, are opposite to each other with respect to said optical standard plane.

5. The optical scanning apparatus as claimed in claim 1, wherein:

said light source part comprises a plurality of light source units; and reflection points of the light beams on said deflecting part, which beams are emitted by said plurality of light sources, are opposite to each other with respect to said optical standard plane.

6. The optical scanning apparatus as claimed in claim 1, wherein:

said plurality of light sources and the corresponding coupling lenses are fixed to a common single member.

7. The optical scanning apparatus as claimed in claim 1, wherein:

said light source part comprises a plurality of light source units; and said plurality of light sources and the corresponding coupling lenses are fixed to respective common single members.

8. The optical scanning apparatus as claimed in claim 1, wherein:

said light source part is configured in such a manner that the light beams from said light source unit are reflected at a same reflection point on said deflecting part.

9. The optical scanning apparatus as claimed in claim 1, wherein:

said light source part comprises a plurality of light source units; and said light source part is configured in such a manner that the light beams from said light source unit are reflected at a same reflection point on said deflecting part.

10. The optical scanning apparatus as claimed in claim 1, wherein:

said light source part comprises a plurality of light source units; and said light source part is configured in such a manner that said plurality of light sources emit the light beams which are applied to said deflecting part at angles different from each other also in the main scanning direction.

11. The optical scanning apparatus as claimed in claim 1, wherein:

said light source part is configured in such a manner that a center line between the light beams emitted from the common light source unit is inclined with respect to the optical standard plane in the sub-scanning direction.

12. The optical scanning apparatus as claimed in claim 1, wherein:

said light source part comprises a plurality of the light source units; and said light source part is configured in such a manner that a center line between the light beams emitted by the plurality of light sources of each of said plurality of light source units intersects with the optical standard plane in a direction different from each other in the sub-scanning direction.

13. The optical scanning apparatus as claimed in claim 1, wherein:

said light source unit is configured in such a manner that the light beams are emitted from a plurality of respective light emitting points of the light source.

14. An image forming apparatus, employing the optical scanning apparatus claimed in claim 1 as a writing part in an electrophotographic system.

15. The optical scanning apparatus as claimed in claim 1, wherein each of said plurality of light sources are inclined at angles different from each other in the sub-scanning direction with respect to the optical standard plane.

* * * * *